US011600850B2

(12) United States Patent
Chao et al.

(10) Patent No.: US 11,600,850 B2
(45) Date of Patent: Mar. 7, 2023

(54) LITHIUM-STUFFED GARNET THIN FILMS AND PELLETS HAVING AN OXYFLUORINATED AND/OR FLUORINATED SURFACE AND METHODS OF MAKING AND USING THE THIN FILMS AND PELLETS

(71) Applicant: QuantumScape Battery, Inc., San Jose, CA (US)

(72) Inventors: Cheng-Chieh Chao, San Jose, CA (US); Lei Cheng, San Jose, CA (US); Christopher Dekmezian, Campbell, CA (US); Tiffany Ho, Fremont, CA (US); Tim Holme, Mountain View, CA (US); Tommy Huang, San Jose, CA (US); Amal Mehrotra, Hayward, CA (US); Aram Yang, Berkeley, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 329 days.

(21) Appl. No.: 16/756,386

(22) PCT Filed: Nov. 6, 2018

(86) PCT No.: PCT/US2018/059505
§ 371 (c)(1),
(2) Date: Apr. 15, 2020

(87) PCT Pub. No.: WO2019/090360
PCT Pub. Date: May 9, 2019

(65) Prior Publication Data
US 2021/0202983 A1    Jul. 1, 2021

Related U.S. Application Data

(60) Provisional application No. 62/582,303, filed on Nov. 6, 2017.

(51) Int. Cl.
*H01M 4/02*        (2006.01)
*H01M 10/0562*     (2010.01)
(Continued)

(52) U.S. Cl.
CPC ...... *H01M 10/0562* (2013.01); *C01G 25/006* (2013.01); *C09C 1/407* (2013.01);
(Continued)

(58) Field of Classification Search
CPC ....................................................... H01M 4/02
See application file for complete search history.

(56) References Cited

U.S. PATENT DOCUMENTS 4,259,061 A    3/1981    Dubetsky
4,340,436 A    7/1982    Dubetsky et al.
(Continued)

FOREIGN PATENT DOCUMENTS

CN    1746757 A      3/2006
CN    101518164 A    8/2009
(Continued)

OTHER PUBLICATIONS

Agrawal et al., "Solid polymer electrolytes: materials designing and all-solid-state battery applications: an overview", Journal of Physics D: Applied Physics 41, 2008, 223001, 18 pages.
(Continued)

*Primary Examiner* — Jacob B Marks
(74) *Attorney, Agent, or Firm* — Squire Patton Boggs (US) LLP

(57) ABSTRACT

Set forth herein are processes for making lithium-stuffed garnet oxides (e.g., $Li_7La_3Zr_2O_{12}$, also known as LLZO) that have passivated surfaces comprising a fluorinate and/or an oxyfluorinate species. These surfaces resist the formation of oxides, carbonates, hydroxides, peroxides, and organics that spontaneously form on LLZO surfaces under ambient conditions. Also set forth herein are new materials made by these processes.

21 Claims, 6 Drawing Sheets

(51) Int. Cl.
*C01G 25/00* (2006.01)
*C09C 1/40* (2006.01)
*H01M 10/0525* (2010.01)
*H01M 10/0585* (2010.01)

(52) U.S. Cl.
CPC ... *H01M 10/0525* (2013.01); *H01M 10/0585* (2013.01); *C01P 2002/30* (2013.01); *C01P 2002/52* (2013.01); *C01P 2002/85* (2013.01); *C01P 2002/86* (2013.01); *C01P 2006/40* (2013.01); *C01P 2006/82* (2013.01); *H01M 2300/0074* (2013.01)

(56) References Cited

U.S. PATENT DOCUMENTS

| | | |
|---|---|---|
| 4,492,783 A | 1/1985 | Tanaka et al. |
| 4,878,838 A | 11/1989 | Verheyden, Jr. |
| 5,014,763 A | 5/1991 | Frank |
| 5,130,067 A | 7/1992 | Flaitz et al. |
| 5,250,243 A | 10/1993 | Allaire et al. |
| 5,256,242 A | 10/1993 | Imaeda et al. |
| 5,279,994 A | 1/1994 | Kerkar |
| 5,296,318 A | 3/1994 | Gozdz et al. |
| 5,456,000 A | 10/1995 | Gozdz et al. |
| 5,460,904 A | 10/1995 | Gozdz et al. |
| 5,620,637 A | 4/1997 | Kaga et al. |
| 5,874,162 A | 2/1999 | Bastian et al. |
| 5,915,958 A | 6/1999 | Kurie |
| 5,922,493 A | 7/1999 | Humphrey, Jr. et al. |
| 6,277,524 B1 | 8/2001 | Kanno |
| 6,306,336 B1 | 10/2001 | Hrezo et al. |
| 6,306,535 B1 | 10/2001 | Tomimatsu et al. |
| 6,322,923 B1 | 11/2001 | Spotnitz et al. |
| 6,447,712 B1 | 9/2002 | Dogan et al. |
| 6,514,072 B1 | 2/2003 | Bencic |
| 6,561,799 B2 | 5/2003 | Baudry et al. |
| 6,656,641 B1 | 12/2003 | Kumar |
| 6,852,138 B1 | 2/2005 | Topsoe et al. |
| 6,863,862 B2 | 3/2005 | Rasouli et al. |
| 6,924,065 B2 | 8/2005 | Noh |
| 7,108,827 B1 | 9/2006 | Hata et al. |
| 7,736,810 B2 | 6/2010 | Noh |
| 7,794,557 B2 | 9/2010 | Hui et al. |
| 7,901,658 B2 | 3/2011 | Weppner et al. |
| 7,923,149 B2 | 4/2011 | Hwang et al. |
| 7,947,213 B2 | 5/2011 | Badding et al. |
| 8,092,941 B2 | 1/2012 | Weppner et al. |
| 8,235,710 B2 | 8/2012 | Bloemacher et al. |
| 8,268,488 B2 | 9/2012 | Neudecker |
| 8,283,843 B2 | 10/2012 | Pan et al. |
| 8,309,258 B2 | 11/2012 | Kanamura et al. |
| 8,329,605 B2 | 12/2012 | Bernard-Granger et al. |
| 8,375,734 B2 | 2/2013 | Hall et al. |
| 8,425,225 B2 | 4/2013 | Pasquinet et al. |
| 8,431,287 B2 | 4/2013 | Teramoto |
| 8,658,317 B2 | 2/2014 | Weppner et al. |
| 8,697,292 B2 | 4/2014 | Kanno et al. |
| 8,828,580 B2 | 9/2014 | Visco et al. |
| 8,865,355 B2 | 10/2014 | Iriyama et al. |
| 8,877,388 B1 | 11/2014 | Ihlefeld et al. |
| 8,940,446 B1 | 1/2015 | Holme et al. |
| 9,034,526 B2 | 5/2015 | Teshima et al. |
| 9,093,717 B2 | 7/2015 | Sakamoto et al. |
| 9,287,106 B1 | 3/2016 | Miao et al. |
| 9,362,546 B1 | 6/2016 | Donnelly et al. |
| 9,790,121 B2 | 10/2017 | Abramov et al. |
| 9,806,372 B2 | 10/2017 | Holme et al. |
| 9,966,630 B2 | 5/2018 | Cheng et al. |
| 9,970,711 B2 | 5/2018 | Iyer et al. |
| 10,008,742 B2 | 6/2018 | Holme et al. |
| 10,026,990 B2 | 7/2018 | Badding et al. |
| 10,103,405 B2 | 10/2018 | Choi et al. |
| 10,155,667 B2 | 12/2018 | Badding et al. |
| 10,283,811 B2 | 5/2019 | Badding et al. |
| 10,290,895 B2 | 5/2019 | Holme et al. |
| 10,305,141 B2 | 5/2019 | Choi et al. |
| 10,347,936 B2 | 7/2019 | Choi et al. |
| 10,347,937 B2 | 7/2019 | Beck et al. |
| 10,361,455 B2 | 7/2019 | Allenic et al. |
| 10,396,396 B2 | 8/2019 | Badding et al. |
| 10,403,931 B2 | 9/2019 | Holme et al. |
| 10,403,932 B2 | 9/2019 | Choi et al. |
| 10,422,581 B2 | 9/2019 | Iyer et al. |
| 10,431,806 B2 | 10/2019 | Donnelly et al. |
| 10,431,850 B2 | 10/2019 | Choi et al. |
| 10,439,251 B2 | 10/2019 | Holme et al. |
| 10,486,332 B2 | 11/2019 | Badding et al. |
| 10,563,918 B2 | 2/2020 | Iyer et al. |
| 10,581,115 B2 | 3/2020 | Badding et al. |
| 10,651,502 B2 | 5/2020 | Holme et al. |
| 10,746,468 B2 | 8/2020 | Iyer et al. |
| 10,766,165 B2 | 9/2020 | Badding et al. |
| 10,804,564 B2 | 10/2020 | Allenic et al. |
| 10,840,544 B2 | 11/2020 | Holme et al. |
| 10,862,161 B2 | 12/2020 | Choi et al. |
| 10,875,212 B2 | 12/2020 | Badding et al. |
| 10,967,539 B2 | 4/2021 | Badding et al. |
| 11,014,822 B2 | 5/2021 | Badding et al. |
| 11,111,155 B1 | 9/2021 | Badding et al. |
| 11,139,503 B2 | 10/2021 | Karpenko et al. |
| 11,148,321 B2 | 10/2021 | Badding et al. |
| 11,158,842 B2 | 10/2021 | Donnelly et al. |
| 11,158,880 B2 | 10/2021 | Chao et al. |
| 11,165,096 B2 | 11/2021 | Allenic et al. |
| 11,171,357 B2 | 11/2021 | Choi et al. |
| 11,171,358 B2 | 11/2021 | Holme et al. |
| 2002/0054419 A1 | 5/2002 | Beteille et al. |
| 2002/0182556 A1 | 12/2002 | Baudry et al. |
| 2003/0049499 A1 | 3/2003 | Murakawa et al. |
| 2003/0072870 A1 | 4/2003 | Brandie et al. |
| 2003/0148179 A1 | 8/2003 | Uyama et al. |
| 2004/0074338 A1 | 4/2004 | Kuhn et al. |
| 2004/0191617 A1 | 9/2004 | Visco et al. |
| 2005/0016839 A1 | 1/2005 | Horne et al. |
| 2006/0120160 A1 | 6/2006 | Park et al. |
| 2006/0197245 A1 | 9/2006 | Cheng et al. |
| 2007/0015061 A1 | 1/2007 | Klaassen |
| 2007/0148553 A1 | 6/2007 | Weppner et al. |
| 2007/0231704 A1 | 10/2007 | Inda |
| 2008/0145751 A1 | 6/2008 | Ogumi et al. |
| 2008/0199822 A1 | 8/2008 | Blomacher et al. |
| 2009/0162755 A1 | 6/2009 | Neudecker |
| 2009/0194222 A1 | 8/2009 | Teramoto |
| 2009/0197172 A1 | 8/2009 | Inda |
| 2009/0226790 A1 | 9/2009 | Kanamura et al. |
| 2009/0298001 A1 | 12/2009 | Klein et al. |
| 2009/0301769 A1 | 12/2009 | Seppa et al. |
| 2009/0311567 A1 | 12/2009 | Visco et al. |
| 2009/0317724 A1 | 12/2009 | Kumar et al. |
| 2010/0047696 A1 | 2/2010 | Yoshida et al. |
| 2010/0062385 A1 | 3/2010 | Pasquinet et al. |
| 2010/0203383 A1 | 8/2010 | Weppner et al. |
| 2011/0045355 A1 | 2/2011 | Ichikawa et al. |
| 2011/0052972 A1 | 3/2011 | Sohn |
| 2011/0053000 A1 | 3/2011 | Kanamura et al. |
| 2011/0053001 A1 | 3/2011 | Babic et al. |
| 2011/0053002 A1 | 3/2011 | Yamamura et al. |
| 2011/0133136 A1 | 6/2011 | Weppner et al. |
| 2011/0198785 A1 | 8/2011 | Kester et al. |
| 2011/0223487 A1 | 9/2011 | Johnson et al. |
| 2011/0244337 A1 | 10/2011 | Ohta et al. |
| 2011/0262796 A1 | 10/2011 | Shimooka et al. |
| 2011/0281175 A1 | 11/2011 | Hudson et al. |
| 2012/0100433 A1 | 4/2012 | Suyama et al. |
| 2012/0196189 A1 | 8/2012 | Babic et al. |
| 2012/0237834 A1 | 9/2012 | Ogasa |
| 2012/0247154 A1 | 10/2012 | Abramov et al. |
| 2012/0276439 A1 | 11/2012 | Fujita et al. |
| 2013/0085055 A1 | 4/2013 | Raj et al. |
| 2013/0122380 A1 | 5/2013 | Visco et al. |
| 2013/0177811 A1 | 7/2013 | Roffat et al. |
| 2013/0189562 A1 | 7/2013 | Dolle et al. |
| 2013/0216783 A1 | 8/2013 | Duan et al. |

(56) References Cited

U.S. PATENT DOCUMENTS

| | | |
|---|---|---|
| 2013/0230778 A1 | 9/2013 | Saimen et al. |
| 2013/0260257 A1 | 10/2013 | Choi |
| 2013/0288875 A1 | 10/2013 | Miyagawa et al. |
| 2013/0344416 A1 | 12/2013 | Sakamoto et al. |
| 2014/0057153 A1 | 2/2014 | Visco et al. |
| 2014/0060723 A1 | 3/2014 | Herle et al. |
| 2014/0072870 A1 | 3/2014 | Otsuka et al. |
| 2014/0093785 A1 | 4/2014 | Sugiura et al. |
| 2014/0099538 A1 | 4/2014 | Johnson et al. |
| 2014/0120409 A1 | 5/2014 | Ouchi et al. |
| 2014/0120421 A1 | 5/2014 | Ouchi et al. |
| 2014/0134438 A1* | 5/2014 | Gadkaree ............ C09K 3/00 427/126.1 |
| 2014/0134483 A1 | 5/2014 | Ouchi et al. |
| 2014/0154586 A1 | 6/2014 | Hayashi et al. |
| 2014/0162113 A1 | 6/2014 | Ohta et al. |
| 2014/0170504 A1 | 6/2014 | Baek et al. |
| 2014/0186720 A1 | 7/2014 | Kintaka |
| 2014/0193695 A1 | 7/2014 | Hoshina et al. |
| 2014/0205910 A1 | 7/2014 | Weppner et al. |
| 2014/0287305 A1 | 9/2014 | Wachsman et al. |
| 2014/0295287 A1 | 10/2014 | Eisele et al. |
| 2014/0377665 A1 | 12/2014 | Yoshida et al. |
| 2015/0015542 A1 | 1/2015 | Hou |
| 2015/0024292 A1 | 1/2015 | Yamada et al. |
| 2015/0037688 A1 | 2/2015 | Otsuka et al. |
| 2015/0044576 A1 | 2/2015 | Eisele et al. |
| 2015/0056520 A1 | 2/2015 | Thokchom et al. |
| 2015/0099188 A1 | 4/2015 | Holme et al. |
| 2015/0099190 A1 | 4/2015 | Holme et al. |
| 2015/0130115 A1 | 5/2015 | Sung et al. |
| 2015/0180001 A1 | 6/2015 | Johnson et al. |
| 2015/0200420 A1 | 7/2015 | Holme et al. |
| 2015/0243974 A1 | 8/2015 | Holme et al. |
| 2015/0295274 A1 | 10/2015 | Engel et al. |
| 2015/0333307 A1 | 11/2015 | Thokchom et al. |
| 2016/0056500 A1 | 2/2016 | Holme et al. |
| 2016/0087321 A1 | 3/2016 | Wöhrle et al. |
| 2016/0111751 A1 | 4/2016 | Badding et al. |
| 2016/0149260 A1 | 5/2016 | Badding et al. |
| 2016/0190639 A1 | 6/2016 | Sung et al. |
| 2016/0204466 A1 | 7/2016 | Nogami et al. |
| 2016/0211547 A1 | 7/2016 | Hwang et al. |
| 2016/0229701 A1 | 8/2016 | Heine et al. |
| 2016/0240887 A1 | 8/2016 | Hatta et al. |
| 2016/0244665 A1 | 8/2016 | Vosgroene et al. |
| 2016/0293988 A1 | 10/2016 | Sakamoto et al. |
| 2016/0308243 A1 | 10/2016 | Herle et al. |
| 2016/0308244 A1 | 10/2016 | Badding et al. |
| 2016/0375607 A1 | 12/2016 | Badding et al. |
| 2017/0005367 A1 | 1/2017 | Van Berkel et al. |
| 2017/0022112 A1 | 1/2017 | Karpenko et al. |
| 2017/0054139 A1 | 2/2017 | Kerkamm |
| 2017/0062873 A1 | 3/2017 | Iyer et al. |
| 2017/0162901 A1 | 6/2017 | Chen et al. |
| 2017/0183265 A1 | 6/2017 | Badding et al. |
| 2017/0210634 A1 | 7/2017 | Badding et al. |
| 2017/0214048 A1 | 7/2017 | Qian et al. |
| 2017/0214084 A1 | 7/2017 | Lei et al. |
| 2018/0069263 A1 | 3/2018 | Holme et al. |
| 2018/0104848 A1 | 4/2018 | Badding et al. |
| 2018/0301754 A1 | 10/2018 | Badding et al. |
| 2018/0375149 A1 | 12/2018 | Beck et al. |
| 2019/0077674 A1 | 3/2019 | Badding et al. |
| 2019/0207252 A1 | 7/2019 | Badding et al. |
| 2019/0214678 A1 | 7/2019 | Hwang et al. |
| 2019/0245178 A1 | 8/2019 | Cao et al. |
| 2019/0260073 A1 | 8/2019 | Chao et al. |
| 2019/0363398 A1 | 11/2019 | Badding et al. |
| 2020/0031014 A1 | 1/2020 | Badding et al. |
| 2020/0083562 A1 | 3/2020 | Kim et al. |
| 2020/0144660 A1 | 5/2020 | Schneider et al. |
| 2020/0266442 A1 | 8/2020 | Badding et al. |
| 2020/0309454 A1 | 10/2020 | Kamei et al. |
| 2020/0365897 A1 | 11/2020 | Badding et al. |
| 2021/0020932 A1 | 1/2021 | Badding et al. |
| 2021/0047243 A1 | 2/2021 | Badding et al. |
| 2021/0242495 A1 | 8/2021 | Kim et al. |
| 2021/0380430 A1 | 12/2021 | Badding et al. |
| 2021/0402646 A1 | 12/2021 | Badding et al. |
| 2022/0149369 A1 | 5/2022 | Badding et al. |
| 2022/0166062 A1 | 5/2022 | Kim et al. |
| 2022/0181628 A1 | 6/2022 | Badding et al. |
| 2022/0209288 A1 | 6/2022 | Badding et al. |
| 2022/0209289 A1 | 6/2022 | Badding et al. |

FOREIGN PATENT DOCUMENTS

| | | |
|---|---|---|
| CN | 101786873 A | 7/2010 |
| CN | 102010183 A | 4/2011 |
| CN | 102280659 A | 12/2011 |
| CN | 103117413 A | 5/2013 |
| CN | 109 378 525 A | 2/2019 |
| EP | 3599068 A1 | 1/2020 |
| EP | 3408246 B1 | 2/2020 |
| JP | H02-111658 A | 4/1990 |
| JP | 2000-128629 | 5/2000 |
| JP | 2001-31476 A | 2/2001 |
| JP | 2004-63261 A | 2/2004 |
| JP | 2006-8488 | 1/2006 |
| JP | 2010-102929 | 5/2010 |
| JP | 2011/070939 A | 4/2011 |
| JP | 2012-031025 | 2/2012 |
| JP | 2012-224520 A | 11/2012 |
| JP | 2012-243743 | 12/2012 |
| JP | 2013-107779 | 6/2013 |
| JP | 2013-134852 | 7/2013 |
| JP | 2013-214421 | 10/2013 |
| JP | 2014-2965 A | 1/2014 |
| JP | 2015-130481 A | 7/2015 |
| JP | 2015-215998 | 12/2015 |
| RU | 2483398 C1 | 5/2013 |
| WO | WO 81/02196 A1 | 8/1981 |
| WO | WO 2009/038674 A2 | 3/2009 |
| WO | WO/2010/051345 A2 | 5/2010 |
| WO | WO 2011/038773 | 4/2011 |
| WO | WO 2012/114175 | 8/2012 |
| WO | WO 2013/010692 | 1/2013 |
| WO | WO 2013/128769 | 9/2013 |
| WO | WO 2015/054320 | 4/2015 |
| WO | WO 2015/076944 | 5/2015 |
| WO | WO 2016/069749 | 5/2016 |
| WO | WO 2017/131676 A1 | 8/2017 |
| WO | WO 2017/197406 A1 | 11/2017 |
| WO | WO 2018/075972 A1 | 4/2018 |
| WO | WO/2018/118964 A1 | 6/2018 |
| WO | WO 2018/236394 A1 | 12/2018 |
| WO | WO 2020/081718 A1 | 4/2020 |
| WO | WO/2020/236767 A1 | 11/2020 |
| WO | WO 2021/146633 A1 | 7/2021 |

OTHER PUBLICATIONS

Ahmad et al., "Concentration and mobility of mobile Li$^+$ ions in Li$_6$BaLa$_2$Ta$_2$O$_{12}$ and Li$_5$La$_3$Ta$_2$O$_{12}$ garnet lithium ion conductors," J Mater Sci: Mater Electron, 2015, vol. 26, pp. 8136-8142.

Ahmad, Mohamad, "Lithium ionic conduction and relaxation dynamics of spark plasma sintered Li$_5$La$_3$Ta$_2$O$_{12}$ garnet nanoceramics", Ahmad Nanoscale Research Letters, 2015, 10:58, DOI: 10.1186/s11671-015-0777-7, 10 pages.

Ahn et al., "Local impedance spectroscopic and microstructural analyses of Al-in-diffused Li$_7$La$_3$Zr$_2$O$_{12}$," Journal of Power Sources, 2014, vol. 254, pp. 287-292.

Allen et al., "Effect of substitution (Ta, Al, Ga) on the conductivity of Li$_7$La$_3$Zr$_2$O$_{12}$", issued on Journal of Power Sources 2012, vol. 206, pp. 315-319.

Arora et al., "Battery Separators", Chemical Reviews, 2004, vol. 104, pp. 4419-4462.

Baek et al., "Garnet related lithium ion conductor processed by spark plasma sintering for all solid state batteries," Journal of Power Sources, 2014, vol. 249, pp. 197-206.

(56) References Cited

OTHER PUBLICATIONS

Baggetto et al., "High Energy Density All-Solid-State Batteries: A Challenging Concept Towards 3D Integration", Advanced Functional Materials, 2008, vol. 18, pp. 1057-1066.

Bernuy-Lopez et al., "Atmosphere Controlled Processing of Ga-Substituted Garnets for High Li-Ion Conductivity Ceramics," Chem. Mater. 2014, vol. 26, pp. 3610-3617.

Bonderer et al., "Free-Standing Ultrathin Ceramic Foils," Journal of the American Ceramic Society, 2010, vol. 93, No. 11, pp. 3624-3631.

Bruce et al., "Li-$O_2$ and Li-S batteries with high energy storage", Nature Materials, Jan. 2012, vol. 11, pp. 19-29.

Buschmann et al. "Lithium metal electrode kinetics and ionic conductivity of the solid lithium ion conductors "$Li_7La_3Zr_2O_{12}$" and $Li_{7-x}La_3Zr_{2-x}Ta_xO_{12}$ with garnet-type strucutre," Journal of Power Sources, 2012, vol. 206, pp. 236-244.

Buschmann et al., "Structure and dynamics of the fast lithium ion conductor $Li_7La_3Zr_2O_{12}$", Phys. Chem. Chem. Phys., 2011, vol. 13, pp. 19378-19392.

Cao et al., "Effect of Sb—Ba codoping on the ionic conductivity of $Li_7La_3Zr_2O_{12}$ ceramic," Ceramics International, 2015, vol. 41, pp. 6232-6236.

Chen et al., "Origin of High Li+ Conduction in Doped $Li_7La_3Zr_2O_{12}$ Garnets," Chemistry of Materials, 2015, vol. 27, pp. 5491-5494.

Chen et al., "Sol-gel derived Li—La—Zr—O thin films as solid electrolytes for lithium-ion batteries", Journal of Materials Chemistry A, 2014, vol. 2, pp. 13277-13282.

Cheng et al., "Effect of microstructure and surface impurity segregation on the electrical and electrochemical properties of dense Al-substituted $Li_7La_3Zr_2O_{12}$," J. Mater. Chem. A, 2014, vol. 2, pp. 172-181.

Cheng et al., "Effect of Surface Microstructure on Electrochemical Performance of Garnet Solid Electrolytes," ACS Appl. Mater. Interfaces, 2015, vol. 7, pp. 2073-2081.

Cheng et al., "Interrelationships among Grain Size, Surface Composition Air Stability, and Interfacial Resistance of Al-Substitued $Li_7La_3Zr_2O_{12}$ Solid Electrolytes," ACS Appl. Mater. Interfaces, 2015, vol. 7, pp. 17649-17655.

Cheng et al., "The origin of high electrolyte-electrode interfacial resistances in lithium cells containing garnet type solid electrolytes," Phys. Chem. Chem. Phys., 2014, vol. 16, pp. 18294-18300.

David et al., "Microstructure and Li-Ion Conductivity of Hot-Pressed Cubic $Li_7La_3Zr_2O_{12}$", J. Am. Cerami. Soc., 2015, pp. 1-6; DOI: 10.1111/jace.13455.

Deng et al., "Effect of the morphology of Li—La—Zr—O Solid electrolyte coating on the electrochemical performance of spinel $LiMn_{1.95}Ni_{0.05}O_{3.98}F_{0.02}$ cathode materials," J. Mater. Chem. A, 2014, vol. 2, pp. 18889-18897.

Dhivya et al., "Effect of Simultaneous Substitution of Y and Ta on the Stabilization of Cubic Phase, Microstructure, and $Li^+$ Conductivity of $Li_7La_3Zr_2O_{12}$ Lithium Garnet," ACS Appl. Mater. Interfaces, 2014, vol. 6, pp. 17606-17615.

Dhivya et al., "$Li^+$ transport properties of W substituted $Li_7La_3Zr_2O_{12}$ cubic lithium garnets," AIP Advances, 2013, vol. 3, pp. 082115.1-082115.21.

Djenadic, Ruzica et al., "Nebulized spray pyrolysis of Al-doped $Li_7La_3Zr_2O_{12}$ solid electrolyte for battery applications," Solid State Ionics, Oct. 2014, vol. 263, pp. 49-56.

Dong et al., "Electrochemical perofmrance and lithium-ion insertion/extraction mechanism studies of the novel $Li_2ZrO_3$ anode materials," Electrochimica Acta, 2015, vol. 161, pp. 219-225.

Duvel, Andre, et al., "Mechanosynthesis of Solid Electrolytes: Preparation, Characterization, and Li Ion Transport Properties of Garnet-Type Al-Doped $Li_7La_3Zr_2O_{12}$ Crystallizing with Cubic Symmetry," The Journal of Physical Chemistry, 2012, vol. 116, pp. 15192-15202.

English translation of the office action of Chinese application No. 201480055386.4 dated Jan. 4, 2017; 9 pages.

Extended European Search Report dated Feb. 22, 2017 for European application No. 14864783.7; 9 pages.

Ferrese et al., "Lithium Redistribution in Lithium-Metal Batteries", Journal of The Electrochemical Society, 2012, vol. 159, pp. A1615-A1623.

Fries, R. et al., "Fabrication and properties of an anisotropic PZT/Polymer 0-3 composite," J. Mater. Sci.: Mater. in Electronics, 1994, vol. 5, pp. 238-243.

Fu et al., "Stabilizing the Garnet Solid-Electrolyte/Polysulfide Interface in Li—S Batteries", Chemistry of Materials, vol. 29, No. 19, Sep. 26, 2017, pp. 8037-8041.

Fu et al., "Toward Garnet electrolyte-based Li metal batteries: An ultrathin, highly effective, artificial solid-state electrolyte/metallic Li interface", Science Advances, vol. 3, No. 4, Apr. 7, 2017, pp. 1-11.

Geiger et al., "Crystal Chemistry and Stability of "$Li_7La_3Zr_2O_2$" Garnet: A Fast Lithium-Ion Conductor," Inorganic Chemistry, 2011, vol. 50, pp. 1089-1097.

Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.

Gorte et al., "Anodes for Direct Oxidation of Dry Hydrocarbons in a Solid-Oxide Fuel Cell", Advanced Materials, Oct. 2, 2000, vol. 12, No. 19, pp. 1465-1469.

Gu et al., "Effects of penta-and trivalent dopants on structures and conductivity $Li_7La_3Zr_2O_{12}$," Solid State Ionics, 2015, vol. 274, pp. 100-105.

Han et a., "Experimental visualization of lithium conduction pathways in garnet-type $Li_7La_3Zr_2O_{12}$", Chem. Commun., 2012, vol. 48, pp. 9840-9842.

Hayashi et al., "New Phases in $La_2O_3$—$Li_2O$—$Ta_2O_5$ System", Mat. Res. Bull. 1986, vol. 21, No. 3, pp. 289-293.

Herrmann et al., "Micro-segregation in liquid phase sintered silicon carbide ceramics," Journal of the European Ceramic Society, Apr. 1, 2010, vol. 30, pp. 1495-1501.

Hitz et al., "Highly Li-Stuffed Garnet-Type $Li_{7+x}La_3Zr_{2-x}Y_xO_{12}$", Journal of The Electrochemical Society, 2013, vol. 160, No. 8, pp. A1248-A1255.

Hyooma et al.,"Crystal Structures of $La_3Li_5M_2O_{12}$ (M=Nb, Ta)", Mat. Res. Bull. 1988, vol. 23, No. 10, pp. 1399-1407.

International Search Report and Written Opinion dated Apr. 15, 2016 in PCT/US2016/015209, 14 pages.

International Search Report and Written Opinion dated Dec. 1, 2016 in PCT/US2016/043428, 11 pages.

International Search Report and Written Opinion dated Mar. 10, 2015 in PCT/US2014/059578, 15 pages.

International Search Report and Written Opinion dated Mar. 23, 2015 in PCT/US2014/059575, 16 pages.

Ishiguro et al., "Stability of Nb-Doped Cubic $Li_7La_3Zr_2O_2$ with Lithium Metal," Journal of the Electrochemical Society, 2013, vol. 160, No. 10, pp. A1690-A1693.

Ito, Seitaro et al., "A rocking chair type all-solid-state lithium ion battery adopting $Li_2O$—$ZrO_2$ coated $LiNi_{0.8}Co_{0.15}Al_{0.05}O_2$ and a sulfide based electrolyte," Journal of Power Sources, 248, 2014, pp. 943-950.

Jalem et al., "Effects of Gallium doping in Garnet-Type $Li_7La_3Zr_2O_{12}$ Solid Electrolytes," Chemistry of Materials, 2015, vol. 27, pp. 2821-2831.

Jalem et al., "Insights into the Lithium-Ion Conduction Mechanism of Garnet-Type Cubic $Li_5La_3Ta_2O_{12}$ by ab-Initio Calculations," J. Phys. Chem. C 2015, vol. 119, pp. 20783-20791.

Janani et al., "Influence of sintering additives on densification and $Li^+$ conductivity of Al doped $Li_7La_3Zr_2O_{12}$ lithium garnet," RSC Adv. 2014, vol. 4, pp. 51228-51238.

Janani et al., "Optimization of Lithium Content and Sintering Aid for Maximized $Li+$ Conductivity and Density in Ta-Doped $Li_7La_3Zr_2O_{12}$," J. Am. Ceram. Soc., 2015, pp. 1-8; DOI: 10.1111/jace.13578.

Jin et al., "Al-doped $Li_7La_3Zr_2O_2$ synthesized by a polymerized complex method," Journal of Power Sources, 2011, vol. 196, pp. 8683-8687.

Jung et al., "Ceramic separators based on Lip-conducting inorganic electrolyte for high-performance lithium-ion batteries with enhanced safety," Journal of Power Sources, 2015, vol. 293, pp. 675-683.

(56) References Cited

OTHER PUBLICATIONS

Kang et al., "First-Principles Study of Chemical Stability of Lithium Oxide Garnets $Li_7La_3M_2O_{12}$ (M=Zr, Sn, or Hf)," The Journal of Physical Chemistry C, 2014, vol. 118 (31), pp. 17402-17406.
Kato et al., "Preparation of thick-film electrode-solid electrolyte composites on $Li_7La_3Zr_2O_{12}$ and their electrochemical properties," Journal of Power Sources, 303, 2016, pp. 65-72.
Katsui et al., "Preparation of cubic and tetragonal $Li_7La_3Zr_2O_{12}$ flim by metal organic chemical vapor deposition," Thin Solid Films, vol. 584, Jun. 1, 2015, pp. 130-134.
Kc et al., "Point defects in garnet-type solid electrolyte (c-$Li_7La_3Zr_2O_{12}$) for Li-ion batteries," Solid State Ionics, 2014, vol. 261, pp. 100-105.
Kerman et al. "Review—Practical Challenges Hindering the Development of Solid State Li Ion Batteries", Journal of the Electrochemical Society, 2017, vol. 164. No. 7, pp. A1731-A1744.
Kerman et al., "Complex oxide nanomembranes for energy conversion and storage: A review", Journal of Materials Research, vol. 29, No. 3, Feb. 14, 2014, pp. 320-337.
Kihira et al., "Effect of Simultaneous Substitution of Alkali Metals and Nb in $Li_7La_3Zr_2O_{12}$ on Lithium-Ion Conductivity," ECS Electrochemistry Letters, 2013, vol. 2, No. 7, pp. A56-A59.
Kim et al., "Characterization of the interface between $LiCoO_2$ and $Li_7La_3Zr_2O_{12}$ in an all-solid-state rechargeable lithium battery," Journal of Power Sources, 2011, vol. 196, pp. 764-767.
Kim et al., "Epitaxial growth and lithium ion conductivity of lithium-oxide garnet for an all solid-state battery electrolyte†", Dalton Transactions, 2013, vol. 42, pp. 13112-13117.
Kim et al., "The Effect of Relative Density on the Mechanical Properties of Hot-Pressed Cubic $Li_7La_3Zr_2O_{12}$," J. Am. Ceram. Soc., 2016, pp. 1-8.; DOI: 10.1111/jace.14084.
Klenk et al., "Local structure and dyanmics of lithium garnet ionic conductors: tetragonal and cubic $Li_7La_3Zr_2O_7$," Phys. Chem. Chem. Phys., 2015, vol. 17, pp. 8758-8768.
Kokal et al., "Preparation and characterization of three dimensionally ordered macroporous $Li_5La_3Ta_2O_{12}$ by colloidal crystal templating for all-solid-state lithium-ion batteries," Ceramics International, 2015, vol. 41, pp. 737-741.
Kokal et al., "Sol-gel synthesis and lithium ion conductivity of $Li_7La_3Zr_2O_{12}$ with garnet-related type structure," Solid State Ionics, 2011, vol. 185, pp. 42-46.
Kong et al., "Transparent Ceramics, Topics in Mining," Springer International Publishing Switzerland, 2015, Metallurgy and Materials Engineering, DOI 10.1007/978-3-319-18956-7_2; pp. 29-91.
Kotobuki et al., "Compatibility of $Li_7La_3Zr_2O_{12}$ Solid Electrolyte to All-Solid-State Battery Using Li Metal Anode", Journal of the Electrochemical Society, 2010, vol. 157, No. 10, pp. A1076-A1079.
Kotobuki et al., "Preparation of Sintered $Li_5La_3Nb_2O_{12}$ Garnet-type Li Ion Conductor via Spark Plasma Sintering Synthesis," Int. J. Electroact. Mater. 2014, vol. 2, pp. 17-21.
Kotobuki et al., "Fabrication of all-solid-state lithium battery with lithium metal anode using $Al_2O_3$-added $Li_7La_3Zr_2O_{12}$ solid electrolyte," Journal of Power Sources, 2011, vol. 196, pp. 7750-7754.
Lai et al., "Ultrahigh-Energy-Density Microbatteries Enabled by New Electrode Architecture and Micropackaging Design," Adv. Mater., 2010, vol. 22, pp. E139-E144.
Lallemant et al., "Transparent polycrystalline alumina obtained by SPS: Green bodies processing effect," Journal of the European Ceramic Society, 2012, vol. 32, pp. 2909-2915.
Langer et al., "Syntheis of single phase cubic Al-substituted $Li_7La_3Zr_2O_{12}$ by solid state lithiation of mixed hydroxides,"Journal of Alloys and Compounds, 2015, vol. 645, pp. 64-69.
Lau et al., "Density Functional Investigation of the Thermodynamic Stability of Lithium Oxide Bulk Crystalline Structures as a Function of Oxygen Pressure", J. Phys. Chemistry C, 2011, vol. 115, pp. 23625-23633.
Lee et al., "High lithium ion conductivity of $Li_2La_3Zr_2O_{12}$ synthesized by solid state reaction," Solid State Ionics, 2014, vol. 258, pp. 13-17.

Li et al., "Optimizing Li conductivity in a garnet framework," J. Mater. Chem., 2012, vol. 22, pp. 15357-15361.
Li et al., "The reaction of $Li_{6.5}La_3Zr_{1.5}Ta_{0.5}O_{12}$ with water," Solid State Ionics, 2015, vol. 269, pp. 57-61.
Li et al., "W-Doped $Li_7La_3Zr_2O_{12}$ Ceramic Electrolytes for Solid State Li-ion Batteries," Electrochimica Acta, 2015, vol. 180, pp. 37-42.
Liu et al., "High Ion Conductivity in Garnet-type F-doped $Li_7La_3Zr_2O_{12}$," Journal of Inorganic Materials, Sep. 2015, vol. 30, No. 9, pp. 995-1001.
Liu et al., "Reversible ion exchange and structural stability of garnet-type Nb-doped $Li_7La_3Zr_2O_{12}$ in water for applications in lithium batteries," Journal of Power Sources, 2015, vol. 282, pp. 286-293.
Liu et al., "Achieving high capacity in bulk-type solid-state lithium ion battery based on $Li_{6.75}La_3Zr_{1.75}Ta_{0.25}O_{12}$ electrolyte: Interfacial resistance," Journal of Power Sources, 2016, vol. 324, pp. 349-357.
Matsuda et al., "Phase formation of a garnet-type lithium-ion conductor $Li_{7-3x}Al_xLa_3Zr_2O_{12}$," Solid State Ionics, 2015, vol. 277, pp. 23-29.
Matsui et al., "Phase stability of a garnet-type lithium ion conductor $Li_7La_3Zr_2O_{12}$," The Royal Society of Chemistry, Dalton Transactions, 2014, vol. 43, pp. 1019-1024.
Matsui et al., "Phase transformation of the garnet structured lithium ion conductor: $Li_7La_3Zr_2O_{12}$", Solid State Ionics, 2014, vol. 262, pp. 155-159.
McCloskey et al., "On the Mechanism of Nonaqueous $Li-O_2$ Electrochemistry on C and Its Kinetic Overpotentials: Some Implications for Li-Air Batteries", J. Phys. Chemistry C, 2012, vol. 116, pp. 23897-23905.
Miara et al., "Effect of Rb and Ta Doping on the Ionic Conductivity and Stability of the Garnet $Li_{7+2x-y}(La_{3-x}Rb_x)(Zr_{2-y}Ta_y)O_{12}$ ($0 \le x \le 0.375$, $0 \le y \le 1$) Superionic Conductor: A First Principles Investigation," Chem. Mater. 2013, vol. 25, pp. 3048-3055.
Miara et al., "First-Principles Studies on Cation Dopants and Electrolyte|Cathode Interphases for Lithium Garnets," Chemestry of Materials, 2015, vol. 27, pp. 4040-4047.
Minami et al., "Crystallization Process for Superionic $Li_7P_3S_{11}$ Glass—Ceramic Electrolytes", Journal of the American Ceramic Society, 2011, vol. 94, pp. 1779-1783.
Mitterdorfer et al., "Fabrication of thin electrolytes for second-generation solid oxide fuel cells," Solid State Ionics, 2000, vol. 131, pp. 79-96.
Miyauchi et al., "New Amorphous Thin Films of Lithium Ion Conductive Solid Electrolyte," Solid State Ionics 9 & 10, 1983, pp. 1469-1472.
Mizuno et al., "Environmentally Friendly Flux Growth of High-Quality, Idiomorphic $Li_5La_3Nb_2O_{12}$ Crystals," Cryst. Growth Des., 2013, vol. 13, pp. 479-484.
Moshkovich et al., "The study of the anodic stability of alkyl carbonate solutions by in situ FTIR spectroscopy, EQCM, NMR and MS," Journal of Electroanalytical Chemistry, 2001, vol. 497, pp. 84-96.
Mukhopadhyay et al., "Structure and Stoichiometry in Supervalent Doped $Li_7La_3Zr_2O_{12}$," Chem. Mater., 2015, vol. 27, pp. 3658-3665.
Murugan et al., "Schnelle Lithiumionenleitung in granatartigem $Li_7La_3Zr_2O_{12}$", Angew. Chem., 2007, vol. 119, pp. 7925-7928, with English translation—"Fast Lithium Ion Conduction in Garnet-Type $Li_7La_3Zr_2O_{12}$", Angew. Chem. Int. Ed., 2007, vol. 46, pp. 7778-7781.
Narayanan et al., "Dopant Concentration—Porosity—Li-Ion Conductivity Relationship in Garnet-Type $Li_{5+2x}La_3Ta_{2-x}Y_xO_{12}$ ($0.05 \le x \le 0.75$) and Their Stability in Water and 1 M LiCl," Inorganic Chemistry, 2015, vol. 54, pp. 6968-6977.
Nemori et al., "Stability of garnet-type solid electrolyte $Li_xLa_3A_{2-y}B_yO_{12}$ (A=Nb or Ta, B=Sc or Zr)," Solid State Ionics, 2015, vol. 282, pp. 7-12.
Neudecker et al., "'Lithium-Free' Thin-Film Battery with In Situ Plated Li Anode," Journal of The Electrochemical Society, 2000, vol. 147, No. 2, pp. 517-523.
Nl et al., "Room temperature elastic moduli and Vickers hardness of hot-pressed LLZO cubic garnet," J. Mater. Sci., 2012, vol. 47, pp. 7978-7985.

(56) References Cited

OTHER PUBLICATIONS

Nyman et al., "Alternative Approach to Increasing Li Mobility in Li—La—Nb/Ta Garnet Electrolytes," Chem. Mater., 2010, vol. 22, No. 19, pp. 5401-5410.

Office Action of Chinese application No. 201480055387.9 dated Dec. 22, 2016 together with English translation; 7 pages.

Office Action of Japanese application No. 2016-520586 dated Nov. 28, 2017 together with English translation; 8 pages.

Ohta et al., "Co-sinterable lithium garnet-type oxide electrolyte with cathode for all-solid-state lithium ion battery," Journal of Power Sources, 2014, vol. 265, pp. 40-44.

Ohta et al., "High lithium ionic conductivity in the garnet-type oxide $Li_{7-x}La_3(Zr_{2-x}, Nb_x)O_{12}(X=0-2)$," Journal of Power Sources, 2011, vol. 196, pp. 3342-3345.

Ohta et al., "All-solid-state lithium ion battery using garnet-type oxide and $Li_3BO_3$ solid electrolytes fabricated by screen-printing," Journal of Power Sources, vol. 238, 2013, pp. 53-56.

Ohta et al., "Electrochemical performance of an all-solid-state lithium ion battery with garnet-type oxide electrolyte," Journal of Power Sources, vol. 202, 2012, pp. 332-335.

Onodera et al., "Flux Growth of Idiomorphic Garnet-Type Solid Electrolyte Crystals for All-Solid-State Lithium-Ion Rechargeable Batteries," The Electrochemical Society, 2012, Abstract #1198, 1 page.

Park et al., "Effects of crystallinity and impurities on the electrical conductivity of Li—La—Zr—O thin films," Thin Solid Films, 2015, vol. 576, pp. 55-60.

Peng et al., "A Reversible and Higher-Rate Li—$O_2$ Battery", Science, Aug. 3, 2012, vol. 337, pp. 563-567.

Puech et al., "Elaboration and characterization of a free standing LiSICON membrane for aqueous lithiumeair battery," Journal of Power Sources, vol. 214, 2012, pp. 330-336.

Quartarone et al., "Electrolytes for solid-state lithium rechargeable batteries: recent advances and perspectives", Chemical Society Reviews, vol. 40, 2011, pp. 2525-2540.

Ramakumar et al., "Structure and Li+ dyanmics of Sb-doped $Li_7La_3Zr_2O_{12}$ fast lithium ion conductors," Phys. Chem. Chem. Phys. 2013, vol. 15, pp. 11327-11338.

Ramzy et al., "Tailor-Made Development of Fast Li Ion Conducting Garnet-Like Solid Electrolytes," American Chemical Society, Applied Materials and Interfaces, 2010, vol. 2, No. 2, pp. 385-390.

Rangasamy et al., "A High Conducting Oxide—Sulfide Composite Lithium Superionic Conductor," J. Mater. Chem. A, published 2014, vol. 2, pp. 4111-4116.

Rangasamy et al., "The effect of 24c-site (A) cation substitution on the tetragonal-cubic phase transition in $Li_{7-x}La_{3-x}A_xZr_2O_{12}$ garnet-based ceramic electrolyte," Journal of Power Sources, 2013, vol. 230, pp. 261-266.

Rangasamy et al., "The role of Al and Li concentration on the formation of cubic garnet solid electrolyte of nominal composition $Li_7La_3Zr_2O_{12}$," Solid State Ionics, 2012, vol. 206, pp. 28-32.

Rao et al.,"In Situ Neutron Diffraction Monitoring of $Li_7La_3Zr_2O_{12}$ Formation: Toward a Rational Synthesis of Garnet Solid Electrolytes," Chemistry of Materials, 2015, vol. 27, pp. 2903-2910.

Raskovalov et al, "Structure and transport properties of $L1_7La_3Zr_{2-0.75x}Al_xO_{12}$ supersonic solid electrolytes," Journal of Power Sources, 2013, vol. 238, pp. 48-52.

Reed, James S., Principles of Ceramics Processing, 2nd Edition, John Wiley & Sons, Inc., New York, Jan. 1995, pp. 60-61.

Reinacher et al., "Preparation an electrical properties of garnet-type $Li_6BaLa_2Ta_2O_{12}$ lithium solid electrolyte thin films prepared by pulsed laser deposition," Solid State Ionics, 2014, vol. 258, pp. 1-7.

Ren et al., "Direct observation of lithium dendrites inside garnet-type lithium-ion solid electrolyte," Electrochemistry Communications, 2015, vol. 57, pp. 27-30.

Ren et al., "Effects of Li source microstructure and ionic conductivity of Al-contained $Li_{6.75}La_3Zr_{1.75}Ta_{0.25}O_{12}$ cermics," Journal of the European Ceramic Society, 2015, vol. 35, pp. 561-572.

Rettenwander et al., "Site Occupation of Ga and Al in Stabilized Cubic $Li_{7-3(x+y)}Ga_xAl_yLa_3Zr_2O_{12}$ Garnets as Deduced from $^{27}Al$ and $^{71}a$ MAS NMR at Ultrahigh Magnetic Fields," Chemistry of Materials, 2015, vol. 27, pp. 3135-3142.

Rettenwander et al., "Synthesis, Crystal Chemistry, and Electrochemical Properties of $Li_{7-2x}La_3Zr_{2-x}Mo_xO_{12}$ (x=0.1-0.4): Stabilization of the Cubic Garnet Polymorph via Substitution of $Zr^{4+}$ by $Mo^{6+}$," Inorganic Chemistry, 2015, vol. 54, pp. 10440-10449.

Rettenwander et al., "DFT study of the role of $Al^{3+}$ in the fast ion-conductor $Li_{7-3x}Al^{3+}{}_xLa_3Zr_2O_{12}$ Garnet," Chem. Mater. 2014, vol. 26, pp. 2617-2623.

Rosero-Navarro et al., "Preparation of $Li_7La_3(Zr_{2-x},Nb_x)O_{12}$ (x=0-1.5) and $Li_3BO_3/LiBO_2$ composites at low temperatures using a sol-gel process," Solid State Ionics, 2016, vol. 285, pp. 6-12.

Sakamoto et al., "Synthesis of nano-scale fast ion conducting cubic $Li_7La_3Zr_2O_{12}$", Nanotechnology, 2013, vol. 24, 424005, 8 pages.

Sakamoto, Jeff, "Garnet-based ceramic electrolyte: Enabling Li metal anodes and solid state batteries," Beyond Lithium Ion VI, Jun. 4-6, 2013, Boulder, CO., 36 pages.

Sakuda et al., "Evaluation of elastic modulus of $Li_2S$—$P_2S_5$ glassy solid electrolyte by ultrasonic sound velocity measurement and compression test", Journal of the Ceramic Society of Japan 121, 2013, pp. 946-949.

Schafbauer et al., "Tape Casting as a Multi Purpose Shaping Technology for Different Applications in Energy Issues", Materials Science Forum vols. 706-709, 2012, pp. 1035-1040.

Schmidt et al., "In-situ, non-destructive acoustic characterization of solid state electrolyte cells", Journal of Power Sources, 2016, vol. 324, pp. 126-133.

Second Office Action of Chinese Application No. 201480055386.4 dated Nov. 1, 2017 together with English translation, 10 pages.

Sharafi et al., "Characterizing the Li—$Li_7La_3Zr_2O_{12}$ interface stability and kinetics as a function of temperature and current density," Journal of Power Sources, 2016, vol. 302, pp. 135-139.

Shimonishi et al., "Synthesis of garnet-type $Li_{7-x}La_3Zr_2O_{12-1/2x}$ and its stability in aqueous solutions," Solid State Ionics, 2011, vol. 183, pp. 48-53.

Shin et al., "Synergistic multi-doping effects on the $Li_7La_3Zr_2O_{12}$ solid electrolyte for fast lithium ion conduction," Scientific Reports, 5:18053; DOI: 10.1038/srep18053, 2015, pp. 1-9.

Song et al., "Crystal structure, migration mechanism and electrochemical performance of Cr-stabilized garnet," 2014, vol. 268, pp. 135-139.

Suárez et al., "Sintering to Transparency of Polycrystalline Ceramic Materials", Mar. 2012, ISBN: 978-953-51-0017-1, 28 pages; InTech, Available from: http://www.intechopen.com/books/sintering-of-ceramics-new-emerging-techniques/sintering-to-transparencyof-polycrystalline-ceramic-materials.

Sudo et al., "Interface behavior between garnet-type lithium-conducting solid electrolyte and lithium metal," Solid State Ionics, 2014, vol. 262, pp. 151-154.

Suzuki et al., "Transparent cubic garnet-type solid electrolyte of $Al_2O_3$-doped $Li_7La_3Zr_2O_{12}$," Solid State Ionics, 2015, vol. 278, pp. 172-176.

Tadanaga et al., "Low temperature synthesis of highly ion conductive $Li_7La_3Zr_2O_{12}$—$Li_3BO_3$ composites," Electrochemistry Communications, 2013, vol. 33, pp. 51-54.

Takada, "Progress and prospective of solid-state lithium batteries", Acta Materialia 61, 2013, pp. 759-770.

Takeda et al., "High Pressure Form of Fluoride Garnets $Na_3M_2Li_3F_{12}$ (M=& Fe)," Mat. Res. Bull., 1977, vol. 12, No. 7, pp. 689-692.

Tan et al., "Fabrication and characterization of $Li_7La_3Zr_2O_{12}$ thin films for lithium ion battery," ECS Solid Sate Letters, vol. 1, No. 6, Oct. 3, 2012, pp. Q57-Q60.

Teng, Shiang, et al., "Recent Developments in garnet based solid state electrolytes for thin film batteries," Current Opinion in Solid State and Materials Science, Feb. 2014, vol. 18, Issue 18, pp. 29-38.

Thangadurai et al., "Fast Solid-State Li Ion Conducting Garnet-Type Structure Metal Oxides for Energy Storage," J. Phys. Chem. Lett, 2015, vol. 6, pp. 292-299.

Thangadurai et al., "$Li_6ALa_2N O_{12}$ (A=Ca, Sr, Ba): A New Class of Fast Lithium Ion Conductors with Garnet-Like Structure," J. Am. Ceram. Soc., 2005, vol. 88, No. 2, pp. 411-418.

(56) References Cited

OTHER PUBLICATIONS

Thangadurai et al., "Novel Fast Lithium Ion Conduction in Garnet-Type $Li_5La_3M_2O_{12}$ (M=NB, Ta)," J. Am. Ceram. Soc., 2003, vol. 86, No. 3, pp. 437-440.
Thangadurai et al., "Garnet-type solid-state fast Li ion conductors for Li batteries: critical review", Chemical Society Reviews, 2014, vol. 43, pp. 4714-4727.
Thompson et al., "A Tale of Two Sites: On Defining the Carrier Concentration in Garnet-Based Ionic Conductors for Advanced Li Batteries," Adv. Energy Mater., 2015, 1500096, pp. 1-9.
Toda, S., et al., "Low temperature cubic garnet-type $CO_2$-doped $Li_7La_3Zr_2O_{12}$," Solid State Ionics, 2013, vol. 233, pp. 102-106.
Tong et al., "Highly Conductive Li Garnets by a Multielement Doping Strategy", Inorganic Chemistry, 2015, vol. 54, pp. 3600-3607.
Ulissi, Ulderico et al., "All solid-state battery using layered oxide cathode, lithium-carbon composite anode and thio-LISICON electrolyte," Solid State Ionics, vol. 296, 2016, pp. 13-17.
Wainwright et al., "Forces generated by anode growth in cylindrical $Li/MoS_2$ cells," Journal of Power Sources, 1991, vol. 34, pp. 31-38.
Wang et al., "Correlation and mechanism of lithium ion diffusion with the crystal strcutre of $Li_7La_3Zr_2O_{12}$ revealed by an internal friction technique," Phys. Chem. Chem. Phys., 2014, vol. 16, pp. 7006-7014.
Wang et al., "The synergistic effects of al and Te on the structure and Li+-mobility of garnet-type solid electrolytes", J. Mater. Chem. A. 2014, vol. 2, pp. 20271-20279.
Wang et al., "Transparent ceramics: Processing, materials and applications," Progress in Solid State Chemistry, 2013, vol. 41, pp. 20-54.
Wang, Dawei et al., "Toward Understanding the Lithium Transport Mechanism in Garnet-type Solid Electrolytes: Li+ Ion Exchanges and Their Mobility at Octahedral/Tetrahedral Sites," Chem. Mater. 2015, vol. 27, pp. 6650-6659.
Wang, Shutao et al., "Syntheses and structures of lithium zirconates for high-temperature $CO_2$ absorption," J. Mater. Chem. A, 2013, vol. 1, pp. 3540-3550.
Wang, Yuxing et al., "Phase transition in lithium garnet oxide ionic conductors $Li_7La_3Zr_2O_{12}$: The role of Ta substitution and $H_2O/CO_2$ exposure," Journal of Power Sources, 2015, vol. 275, pp. 612-620.
Wilkinson et al., "Effects of physical constraints on Li cycability," Journal of Power Sources, 1991, vol. 36, pp. 517-527.
Wolfenstine et al., "A preliminary investigation of fracture toughness of $Li_7La_3Zr_2O_{12}$ and its comparisoin to other solid Li-ion conductors," Materials letters, 2013, vol. 96, pp. 117-120.
Wolfenstine et al., "Chemical stability of cubic $Li_7La_3Zr_2O_{12}$ with molten lithium at elevated temperature", J. Mater. Sci., 2013, vol. 48, pp. 5846-5851. DOI 10.1007/s10853-013-7380-z.
Xie et al., "Lithium Distribution in Aluminum-Free Cubic $Li_7La_3Zr_2O_{12}$", issued on Chem. Mater. 2011, vol. 23, pp. 3587-3589.
Xie et al., "Low-temperature synthesis of $Li_7La_3Zr_2O_{12}$ with cubic garnet-type structure," Materials Research Bulletin, 2012, vol. 47, pp. 1229-1232.
Xu et al., "Multistep sintering to synthesize fast lithium garnets," Journal of Power Sources, 2016, vol. 302, pp. 291-297.
Yang et al., "Nanostructured Garnet-Type Solid Electrolytes for Lithium Batteries: Electrospinning Synthesis of $Li_7La_3Zr_2O_{12}$ Nanowires and Particle Size-Dependent Phase Transformation", J.Physical Chemistry C, 2015, vol. 119, pp. 14947-14953.
Yi et al., "Flame made nanoparticles permit processing of dense, flexible, Li+ conducting ceramic electrolyte thin films of cubic-$Li_7La_3Zr_2O_{12}$ (c-LLZO)", J. Mater. Chem. A, 2016, vol. 4, pp. 12947-12954.
Yi et al., "Key parameters governing the densification of cubic-$Li_7La_3Zr_2O_{12}Li+$conductors", Journal of Power Sources, Elsevier SA, CH, vol. 352, Mar. 31, 2017, pp. 156-164.
Yoshima et al., "Thin hybrid electrolyte based on garnet-type lithium-ion conductor $Li_7La_3Zr_2O_{12}$ for 12 V-class bipolar batteries," Journal of Power Sources, 2016, vol. 302, pp. 283-290.

Zaiss et al., "Fast ionic conduction in cubic hafnium garnet $Li_7La_3Hf_2O_{12}$," Ionics, Springer-Verlag, 2010, vol. 16, pp. 855-858.
Zhang et al., "Effect of lithium ion concentration on the microstructure evolution and its association with the ionic conductivity of cubic garnet-type nominal $Li_7Al_{0.25}La_3Zr_2O_{12}$ solid electrolytes", Solid State Ionics, 2016, vol. 284, pp. 53-60.
Zhang et al., "Field assisted sintering of dense Al-substituted cubic phase $Li_7La_3Zr_2O_{12}$ solid electrolytes", Journal of Power Sources, 2014, vol. 268, pp. 960-964.
Zhang et al., "Preparation of cubic $Li_7La_3Zr_2O_{12}$ solid electrolyte using a nano-sized core-shell structured precursor", Journal of Alloys and Compounds, 2015, vol. 644, pp. 793-798.
Willmann et al., "Characteristics and evaluation criteria of substrate-based manufacturing. Is roll-to-roll the best solution for printed electronics?", Organic Electronics, 2014, vol. 15, pp. 1631-1640.
Preliminary Rejection of Korean Patent Application No. 10-2021-7024341 dated Nov. 8, 2021 with the English translation.
Cheng et al., "Measurement of the Sintering Pressure in Ceramic Films", J. Am. Ceram. Soc., 1988, vol. 71, No. 4, pp. 276-280.
Cologna et al., "Effect of Al and Ce doping on the deformation upon sintering in sequential tape cast layers for solid oxide fuel cells", Journal of Power Sources, vol. 193, 2009, pp. 80-85.
Cologna et al., "Vertical sintering to measure the uniaxial viscosity of thin ceramic layers", Acta Materialia, vol. 58, 2010, pp. 5558-5564.
Gotschel et al., "Processing of preceramic paper and ceramic green tape derived multilayer structures", Advances in Applied Ceramics, vol. 112, No. 6, 2013, pp. 358-365.
Han et al., "Control of shrinkage on the behavior of co-firing of ferrite and varistor multi-layers composite with organic content", J Electroceram, 2009, vol. 23, pp. 559-563.
Muralidharan et al., "Optimization of process parameters for the production of Ni—Mn—Co—Fe based NTC chip thermistors through tape casting route", Journal of Alloys and Compounds, 2011, vol. 509, pp. 9363-9371.
Yang et al., "Tape-casted transparent alumina ceramic wafers", J. Mater. Res., Oct. 14, 2014, vol. 29, No. 19, pp. 2312-2317.
Yu et al., "Experimental determination of the uniaxial viscosity of low-temperature co-fired ceramic tapes by vertical sintering", Ceramics International, 2014, vol. 40, pp. 9367-9375.
Olenick, "Ultra-Thin Flexible Ceramic Membranes for Electronic Applications", 46th International Symposium on Microelectronics (IMAPS 2013) | Sep. 30-Oct. 3, 2013 | Orlando, FL, USA; 5 pages.
Reppert T. et al.,"$Li_7La_3Zr_2D_{12}$ electrolyte for all-solid-state batteries", Future Energy, Oct. 17, 2014, pp. 1-1, XP055813972, Retrieved from the Internet: URL:https://juser.fz-juelich.de/record/171892/files/FZJ-2014-05448.pdf [retrieved on Jun. 15, 2021].
Reppert T. et al., "Oxide-ceramic electrolyte layers for all-solid-state lithium batteries", Jan. 21, 2015, pp. 1-1, XP055814028, Retrieved from the Internet: URL:https://juser.fz-juelich.de/record/188042/files/FZJ-2015-01520.pdf.
Extended European search report of EP application No. 21187050.6 dated Jan. 7, 2022; 12 pages.
Cheng J. et al., "On the green density sintering behavior and electrical property of tape cast $Ce_{0.9}Gd_{0.1}O_{1.95}$ electrolyte films", Materials Research Bulletin, Dec. 1, 2002, vol. 37, No. 15, pp. 2437-2446, XP004395782.
Gurauskis et al., "Laser drilling of Ni—YSZ cermets", Journal of the European Ceramic Society, Oct. 1, 2008, vol. 28, No. 14, pp. 2671-2680, XP023610743.
Rauscher et al. "Steel-sheet fabrication by tape casting, Low Temperature Cofired Ceramics LTCC View project Colloidal Processing View project", International Journal of Powder Metallurgy, vol. 44, No. 6, 2008, 11 pages.
Hu et al., "Highly conductive paper for energy-storage devices", PNAS, Dec. 22, 2009, vol. 106, No. 51, pp. 21490 -21494; www.pnas.org/cgi/doi/10.1073/pnas.090885810.
Wang et al., "A general method to synthesize and sinter bulk ceramics in seconds", Science 368, (2020) May 1, 2020, pp. 521-526.
International Search Report and Written Opinion of PCT/US2022/019641 dated Jul. 7, 2022; 14 pages.

(56) References Cited

OTHER PUBLICATIONS

English translation of the First office Action of Chinese patent Application No. 202111593888.0 dated Oct. 31, 2022; 15 pages.

\* cited by examiner

LITHIUM-STUFFED GARNET THIN FILMS AND PELLETS HAVING AN OXYFLUORINATED AND/OR FLUORINATED SURFACE AND METHODS OF MAKING AND USING THE THIN FILMS AND PELLETS

CROSS-REFERENCE TO RELATED APPLICATION

This application claims the benefit of priority to U.S. Provisional Patent Application No. 62/582,303, filed Nov. 6, 2018, and titled LITHIUM-STUFFED GARNET THIN FILMS AND PELLETS HAVING AN OXYFLUORINATED AND/OR FLUORINATED SURFACE AND METHODS OF MAKING AND USING THE THIN FILMS AND PELLETS, the entire contents of which are herein incorporated by reference in its entirety for all purposes.

BACKGROUND

Conventional rechargeable batteries use liquid electrolytes to physically separate and thereby electrically insulate the positive and negative electrodes (i.e., cathodes and anodes, respectively). However, liquid electrolytes suffer from several problems including flammability during thermal runaway, outgassing at high voltages, and chemical incompatibility with lithium metal negative electrodes. As an alternative, solid electrolytes have been proposed for next generation rechargeable batteries. For example, $Li^+$ ion-conducting ceramic oxides, such as lithium-stuffed garnets (e.g., $Li_3La_7Zr_2O_{12}$, aka LLZO), have been considered as electrolyte separators. See, for example, US Patent Application Publication No. 2015/0099190, published Apr. 9, 2015, and filed Oct. 7, 2014, titled GARNET MATERIALS FOR LI SECONDARY BATTERIES AND METHODS OF MAKING AND USING GARNET MATERIALS; U.S. Pat. Nos. 8,658,317; 8,092,941; and 7,901,658; also US Patent Application Publication Nos. 2011/0281175; 2013/0085055; 2014/0093785; and 2014/0170504; also Bonderer, et al. "Free-Standing Ultrathin Ceramic Foils," Journal of the American Ceramic Society, 2010, 93(11):3624-3631; and Murugan, et al., *Angew Chem. Int. Ed.* 2007, 46, 7778-7781), the entire contents of each of these publications are incorporated by reference in their entirety for all purposes.

When LLZO is sintered (e.g., US Patent Application Publication No. 2016/0087321 to Wohrle, et al.) and subsequently exposed to ambient conditions (room temperature, natural atmosphere, e.g., 78% $N_2$ & 21% $O_2$; and/or with moisture also present), the surface of LLZO is contaminated with surface species which may negatively affect $Li^+$ ion-conductivity. For example, lithium carbonate ($Li_2CO_3$) spontaneously forms on LLZO surfaces when exposed to ambient conditions. The mechanism of lithium carbonate formation on LLZO when exposed to ambient conditions is known. For example, see Cheng, L., et al., "Interrelationships among Grain Size, Surface Composition, Air Stability, and Interfacial Resistance of Al-Substituted $Li_7La_3Zr_2O_{12}$ Solid Electrolytes," *ACS Appl. Mater. Interfaces*, 2015, 7 (32), pp 17649-17655, which discloses that LLZO can form $Li_2CO_3$ via two pathways: the first pathway involves a reaction with moisture in air to form LiOH, which subsequently reacts with $CO_2$ to form $Li_2CO_3$; and the second pathway involves direct reaction between LLZO and $CO_2$. See also Cheng, L., et al., *Phys. Chem. Chem. Phys.*, 2014, 16, 18294-18300, which discloses that $Li_2CO_3$ was formed on the surface when LLZO pellets were exposed to air. Lithium carbonate as well as other forms of surface contamination, e.g., oxides, carbonates or organics, may negatively affect the electrochemical performance of a solid electrolyte in an electrochemical device by increasing the interfacial impedance between the LLZO solid electrolyte and other electrochemical device components. Previous solutions, e.g., U.S. Pat. No. 9,966,630 B2, which issued May 8, 2018 and is titled ANNEALED GARNET ELECTROLYTE SEPARATORS, the entire contents of which are herein incorporated by reference in its entirety for all purposes, include using an annealing step to remove surface species that negatively affect electrochemical performance. However, improvements are still needed.

There is therefore a need for processes for decreasing the interfacial resistance of LLZO thin film solid electrolytes by passivating the LLZO surface, with respect to surface reactions that result in surface contaminants that negatively affect $Li^+$ ion conductivity, as well as processes for removing these surface contaminants. New materials made by these processes are also needed. The instant disclosure sets forth solutions to these problems as well as other unmet needs in the relevant art.

SUMMARY

In one embodiment, set forth herein is a process, including the following steps (1) providing a solution including a fluoride salt and a solvent; (2) providing a sintered lithium-stuffed garnet thin film or pellet; (3) immersing at least one surface of the sintered lithium-stuffed garnet thin film or pellet in the solution at a temperature between, or equal to, 0° C. and 60° C.; and (4) removing the at least one surface of the sintered lithium-stuffed garnet thin film from the solution. In some examples, the process is performed in the order in which the steps are recited.

In a second embodiment, set forth herein is a sintered lithium-stuffed garnet thin film or pellet, wherein the thin film or the pellet includes a top surface and bottom surface and a bulk therebetween, wherein the top surface or bottom surface, or both, include fluorine, and wherein the fluorine is incorporated into, or bonded to, the lithium-stuffed garnet.

In a third embodiment, set forth herein is a sintered lithium-stuffed garnet thin film made by a process set forth herein.

In a fourth embodiment, set forth herein is a method, including the following steps providing a sintered lithium-stuffed garnet thin film or pellet set forth herein; exposing the sintered thin film lithium-stuffed garnet thin film or pellet to ambient conditions; and measuring the ASR of the sintered thin film lithium-stuffed garnet; wherein the sintered lithium-stuffed garnet thin film or pellet includes: a top surface and bottom surface and a bulk therebetween, wherein the top surface or bottom surface, or both, comprise fluorine; wherein the fluorine is incorporated into, or bonded to, the lithium-stuffed garnet.

In a fifth embodiment, set forth herein is an electrochemical device including a sintered thin film lithium-stuffed garnet thin film or pellet prepared by a process set forth herein or a sintered thin film lithium-stuffed garnet thin film or pellet set forth herein.

In a sixth embodiment, set forth herein is an electric vehicle including an electrochemical device set forth herein, a sintered lithium-stuffed garnet thin film or pellet prepared by a process set forth herein, or a sintered lithium-stuffed garnet thin film or pellet set forth herein.

BRIEF DESCRIPTIONS OF THE DRAWINGS

FIG. 1 shows X-ray photoelectron spectroscopy (XPS) results for the sintered thin films described in Example 1: (a) Non-soaked control sintered thin films, (b) sintered thin films soaked in an electrolytic solution mixture of ethylene carbonate and sulfolane (ECS) and the lithium salt, $LiPF_6$, (c) sintered thin films soaked in an electrolytic solution mixture of SCN and the lithium salt, $LiBF_4$, and (d) sintered thin films soaked in an electrolytic solution mixture of two dinitrile solvents and the lithium salt, $LiBF_4$ electrolytic solution.

DETAILED DESCRIPTION

Figure 1:
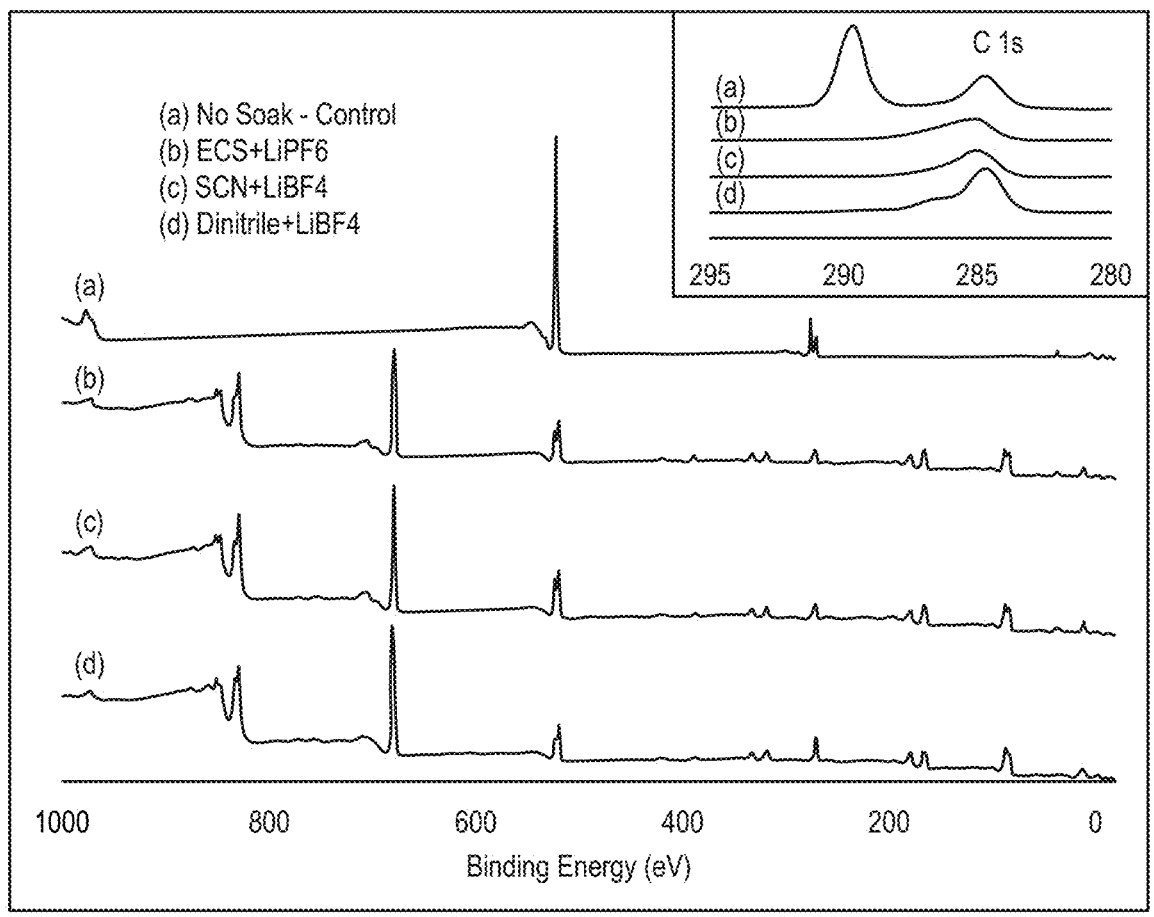

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the inventions herein are not intended to be limited to the embodiments presented, but are to be accorded their widest scope consistent with the principles and novel features disclosed herein.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

I. General

The instant disclosure set forth processes that include simple, industrial scalable low temperature steps, which are carried out at a temperature lower than 60° C. and which enhance the interfacial property of a lithium-stuffed garnet thin film electrolyte thin film or pellet separator. As a result of the processes set forth herein, a lithium-stuffed garnet surface that is free, or has a trace fraction, of lithium carbonate is formed. The lithium-stuffed garnet surface formed (i.e., treated or modified) by the processes, herein, has a fluorinated or oxyfluorinated surface.

The invention disclosed herein uses certain types of organic electrolyte solutions to clean the surface of garnet-type solid electrolyte. A garnet thin film electrolyte is either soaked before assembly into a battery or directly used as is in the cell assembly using the organic electrolyte. As the result of the contact between the liquid electrolyte and garnet surface, surface $Li_2CO_3$ is etched away and garnet solid electrolyte surface is exposed. The exposed garnet surface is fluorinated or oxyfluorinated and shows improved stability in ambient environments for at least up to 3 days. The treated lithium-stuffed garnets described herein maintain a low area-specific resistance (ASR).

The processes set forth herein include, but are not limited to, (1) a process that removes the $Li_2CO_3$ from lithium-stuffed garnet; (2) a process that provides a fluorinated surface including Li—Zr—La—Al—O—F on lithium-stuffed garnet; and (3) a process that provides an oxyfluorinated surface including Li—Zr—La—Al—O—F on lithium-stuffed garnet.

The processes set forth herein not only remove $Li_2CO_3$ from lithium-stuffed garnet, but these processes also provide stable lithium-stuffed garnet surfaces that inhibit or slow the rate of formation of $Li_2CO_3$ when the surfaces are exposed to ambient conditions.

II. Definitions

As used herein, the term "about," when qualifying a number, e.g., 15% w/w, refers to the number qualified and optionally the numbers included in a range about that qualified number that includes±10% of the number. For example, about 15 w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, the phrase "ambient conditions," refers to room temperature and a natural atmosphere such as the atmosphere of planet Earth that includes approximately 78% $N_2$ & 21% $O_2$; and/or with moisture also present. Ambient conditions include standard temperature and pressure, with a relative humidity of at least 1%.

As used herein, the term "annealing" refers to a process wherein a sintered electrolyte thin film is heated from 200° C. to 1000° C. in a reducing atmosphere such as but not limited to Argon, hydrogen, or a combination thereof. Example anneal processes are described in U.S. Pat. No. 9,966,630 B2, which issued May 8, 2018 and is titled ANNEALED GARNET ELECTROLYTE SEPARATORS, the entire contents of which are herein incorporated by reference in its entirety for all purposes.

As used herein, the phrase "at least one member selected from the group" includes a single member from the group, more than one member from the group, or a combination of members from the group. At least one member selected from the group consisting of A, B, and C includes, for example, A, only, B, only, or C, only, as well as A and B as well as A and C as well as B and C as well as A, B, and C or any combination of A, B, and C.

As used herein, the term "ASR" refers to area specific resistance.

As used herein, the term "bulk" refers to a portion or part of a material that is extended in space in three-dimensions by at least 1 micron (μm). The bulk refers to the portion or part of a material which is exclusive of its surface, as defined below. The bulk portion of a lithium-stuffed garnet thin film or pellet, which has a fluorinated or oxyfluorinated surface, is the interior portion of the thin film or pellet which is not fluorinated or oxyfluorinated. Whether a portion of the thin film or pellet is fluorinated or oxyfluorinated is determined by whether fluoride or oxyfluoride species are detectable by XPS in the portion. The bulk of a thin film or pellet is also characterized as the portion of the thin film or pellet which is not at the surface of the thin film or pellet and which is therefore not exposed at the surface of the thin film or pellet.

As used herein, the term "contaminant" refers to a chemical deviation from a pristine material. A contaminant in a lithium-stuffed garnet may include any material other than lithium-stuffed garnet such as, but not limited to, a lithium carbonate, a lithium hydroxide, a lithium oxide, a lithium peroxide, a hydrate thereof, an oxide thereof, or a combination thereof, wherein oxide and lithium oxide do not include a lithium-stuffed garnet. Contaminants of a garnet may include, but are not limited to, hydroxides, peroxides, oxides, carbonates, and combination thereof, which are not lithium-stuffed garnet.

As used herein, the term "drying" refers to a process of evaporating a solvent or a solution from a material such as a thin film or a pellet. Drying can be passive wherein a thin film or pellet is dried where it is stored by allowing the solvent or solution to evaporate. Drying can be active wherein a thin film or pellet is heated to drive off a solvent or a solution. Drying, storing, and heating may be performed in ambient conditions. Drying, storing, and heating may be performed in dry room conditions. Drying, storing, and heating may be performed in glove box conditions.

As used herein, the term "electrolyte" refers to an ionically conductive and electrically insulating material. Electrolytes are useful for electrically insulating the positive and negative electrodes of a rechargeable battery while allowing for the conduction of ions, e.g., Li⁺, through the electrolyte.

As used herein, the phrases "electrochemical cell" or "battery cell" shall, unless specified to the contrary, mean a single cell including a positive electrode and a negative electrode, which have ionic communication between the two using an electrolyte. In some embodiments, a battery or module includes multiple positive electrodes and/or multiple negative electrodes enclosed in one container, i.e., stacks of electrochemical cells. A symmetric cell unless specified to the contrary is a cell having two Li metal anodes separated by a solid-state electrolyte.

As used herein the phrase "electrochemical stack," refers to one or more units which each include at least a negative electrode (e.g., Li, $LiC_6$), a positive electrode (e.g., Li-nickel-manganese-oxide or $FeF_3$, optionally combined with a solid state electrolyte or a gel electrolyte), and a solid electrolyte (e.g., lithium-stuffed garnet electrolyte set forth herein) between and in contact with the positive and negative electrodes. In some examples, between the solid electrolyte and the positive electrode, there is an additional layer comprising a gel electrolyte. An electrochemical stack may include one of these aforementioned units. An electrochemical stack may include several of these aforementioned units arranged in electrical communication (e.g., serial or parallel electrical connection). In some examples, when the electrochemical stack includes several units, the units are layered or laminated together in a column. In some examples, when the electrochemical stack includes several units, the units are layered or laminated together in an array. In some examples, when the electrochemical stack includes several units, the stacks are arranged such that one negative electrode is shared with two or more positive electrodes. Alternatively, in some examples, when the electrochemical stack includes several units, the stacks are arranged such that one positive electrode is shared with two or more negative electrodes. Unless specified otherwise, an electrochemical stack includes one positive electrode, one solid electrolyte, and one negative electrode, and optionally includes a gel electrolyte layer between the positive electrode and the solid electrolyte.

As used herein, the phrase "electrochemical device" refers to an energy storage device, such as, but not limited to a Li-secondary battery that operates or produces electricity or an electrical current by an electrochemical reaction, e.g., a conversion chemistry reaction such as $3Li+FeF_3 \leftrightarrow 3LiF+Fe$.

As used herein, the phrase "film" or "thin film" refers to a thin membrane of less than 0.5 mm in thickness and greater than 10 nm in thickness. A thin film is also greater than 5 mm in a lateral dimension. A "film" or "thin-film" may be produced by a continuous process such as tape-casting, slip casting, or screen-printing.

As used herein, the phrase "film thickness" refers to the distance, or median measured distance, between the top and bottom faces of a film. As used herein, the top and bottom faces refer to the sides of the film having the largest surface area. As used herein, thickness is measured by cross-sectional scanning electron microscopy.

As used herein, the term "pellet" refers to a small unit of bulky material compressed into any of several shapes and sizes, e.g., cylindrical, rectangular, or spherical. The compressed material is disc-shaped and may be 5-20 cm in diameter and 0.5 to 2 cm in height. Typically, the compressed material is disc-shaped and 10 cm in diameter and 1 cm in height. Pellets may also include additional agents to help bind the material compressed into the pellet. In some examples, these additional agents are referred to as binding agents and may include, but are not limited to, polymers such as poly(ethylene)oxide. In some examples, polyvinyl butyral is used as a binding agent. Pellets are typically made by pressing a collection of powder materials in a press. This pressing makes the powder materials adhere to each other and increases the density of the collection of powder material when compared to the density of the collection of powder material before pressing. In some instances, the powder material is heated and/or an electrical current is passed through the powder material during the pressing.

As used herein, the term "pressed pellet" refers to a pellet having been submitted to a pressure (e.g., 5000 PSI) to further compress the pellet.

As used herein, the phrase "lithium-stuffed garnet" refers to oxides that are characterized by a crystal structure related to a garnet crystal structure. Lithium-stuffed garnets include compounds having the formula $Li_A La_B M'_C M''_D Zr_E O_F$, or $Li_A La_B M'_C M''_D Nb_E O_F$, wherein $4<A<8.5$, $1.5<B<4$, $0 \leq C \leq 2$, $0 \leq D \leq 2$; $0 \leq E < 2.5$, $10 < F < 13$, and M' and M'' are each, independently in each instance selected from Al, Mo, W, Nb, Ga, Sb, Ca, Ba, Sr, Ce, Hf, Rb, and Ta; or $Li_a La_b Zr_c Al_d Me''_e O_f$, wherein $5 < a < 7.7$; $2 < b < 4$; $0 < c \leq 2.5$; $0 \leq d < 2$; $0 \leq e < 2$, $10 < f < 13$ and Me'' is a metal selected from Nb, V, W, Mo, Ta, Ga, and Sb. Garnets, as used herein, also include those garnets described above that are doped with Al or $Al_2O_3$. Also, garnets as used herein include, but are not limited to, $Li_x La_3 Zr_2 O_{12} + y Al_2 O_3$, wherein x may be from 5.8 to 7.0, and y may be 0.1, 0.2, 0.3, 0.4, 0.5, 0.6, 0.7, 0.8, 0.9, or 1.0. As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein, the phrase "lithium interfacial resistance" refers to the interfacial resistance of a material towards the incorporation or conduction of $Li^+$ ions. A lithium interfacial ASR ($ASR_{interface}$) is calculated from the interfacial resistance ($R_{interface}$) via $ASR_{interface}=R_{interface}*A/2$ where A is the area of the electrodes in contact with the separator and the factor of 2 accounts for 2 interfaces, assuming the cell is symmetric.

As used herein, the phrase "positive electrode" refers to the electrode in a secondary battery towards which positive ions, e.g., $Li^+$, conduct during discharge of the battery. As used herein, the phrase "negative electrode" refers to the electrode in a secondary battery from where positive ions, e.g., $Li^+$, conduct during discharge of the battery. In a battery comprised of a Li-metal electrode and a conversion chemistry electrode (i.e., active material; e.g., $NiF_x$), the electrode having the conversion chemistry materials is referred to as the positive electrode. In some common usages, cathode is used in place of positive electrode, and anode is used in place of negative electrode. When a Li-secondary battery is charged, Li ions conduct from the positive electrode (e.g., $NiF_x$) towards the negative electrode (Li-metal). When a Li-secondary battery is discharged, Li ions conduct towards the positive electrode (e.g., $NiF_x$; i.e., cathode) and from the negative electrode (e.g., Li-metal; i.e., anode).

As used herein, the terms "separator" refers to a solid electrolyte which conducts $Li^+$ ions, is substantially insulating to electrons, and is suitable for use as a physical barrier or spacer between the positive and negative electrodes in an electrochemical cell or a rechargeable battery. A separator, as used herein, is substantially insulating to electrons when the separator's lithium ion conductivity is at least $10^3$ times, and typically $10^6$ times, greater than the separator's electron conductivity. Unless explicitly specified to the contrary, a separator as used herein is stable when in contact with lithium metal.

As used herein, the term "surface" refers to a material, or portion of a material, that is near or at an interface between two different phases, chemicals, or states of matter. A surface is the area of contact between two different phases or states of matter (e.g., solid-gas, liquid-gas, or solid-liquid). For example, the interface of two solids which are in direct contact with each other is a surface. For example, a thin film garnet separator when exposed to air has a surface described by the periphery or outside portion of the separator which contacts the air. For rectangular-shaped separators, there is a top and a bottom surface which both individually have higher total geometric surface areas than each of the four side surfaces individually. In this rectangular-shaped separator example, there are four side surfaces which each have geometric surface areas less than either of the top and bottom surfaces. For a disc-shaped separator, there is a top and a bottom surface which both individually have higher geometric surface areas than the circumference-side of the disc-shaped separator. Geometric surface area is calculated for a square or rectangular shaped-surface by multiplying length of the surface by the width of the surface. Geometric surface area is calculated for disc-shaped surface by multiplying $\pi$ by the squared radius of the disc, i.e., $\pi r^2$ wherein r is the radius of the disc surface. Geometric surface area is calculated for the side of a disc by multiplying the disc circumference by the width of the side of the disc. When used as an electrolyte in an electrochemical cell, either the top or bottom surface is the surface of the separator which directly contacts the negative electrode (e.g., Li metal), the positive electrode (i.e. cathode or catholyte in the cathode), and/or a layer or adhesive bonding agent disposed between the separator and the positive electrode. A surface is defined by an area that has larger, or more extended, x- and y-axis physical dimensions than it does z-axis physical dimensions, wherein the z-axis dimension is perpendicular to the surface. The depth, roughness or thickness of a surface can be of a molecular order (0.1 to 10 nanometers) of magnitude or up to 1, 2, 3, 4, or 5 µm.

As used herein, the term "top and bottom surfaces" refer to the two surfaces that have the largest total geometric surface area for a material having more than two surfaces. For example, a rectangle has six surfaces—four side surfaces and one top and one bottom surface. In such a rectangle, there is one top and one bottom surface which are parallel to each other. In a rectangle, there are four side surfaces which are perpendicular to both the top and bottom surfaces. In a rectangle, the top and bottom surfaces individually have a larger geometric surface area than the geometric surface area of each of the four side surfaces individually.

As used herein, the phrase "fluorinated" refers to the presence of a chemical species that includes fluorine or fluoride.

As used herein, the phrase "fluorinated surface" refers to a surface to which fluoride is bonded or incorporated as determined by XPS or NMR. Unless specified explicitly otherwise, the fluorinated surface feature is determined by XPS.

As used herein, the phrase "oxyfluorinated" refers to the presence of a chemical species that includes oxygen and fluorine or oxygen and fluoride.

As used herein, the phrase "oxyfluorinated surface" refers to a surface to which oxygen and fluorine is bonded or incorporated as determined by XPS or NMR. Unless specified explicitly otherwise, the oxyfluorinated surface feature is determined by XPS.

As used herein, the phrase "substantially free of" refers to the presences of a chemical species below the XPS detectable limit. For example, a lithium-stuffed garnet that is substantially free of $Li_2CO_3$ on its surface has $Li_2CO_3$ on the surface in an amount less than 1 atomic % measured by XPS. As used herein, the phrase "trace amounts of contaminants," refers to the presences of a chemical species below the XPS detectable limit.

As used herein, the term "LiBETI" refers to lithium bis(perfluoroethanesulfonyl)imide.

As used herein, the term "LiTFSI" refers to lithium bis(trifluoromethane)sulfonimide.

As used herein, the term "LiFSI" refers lithium bis(fluorosulfonyl)imide.

As used herein, the term "LIBOB" refers to lithium bis(oxalato)borate.

As used herein, the term "XPS" refers to X-ray photoelectron spectroscopy which is a surface-sensitive quantitative spectroscopic technique that measures the elemental composition at the parts per thousand range. XPS is useful for determining the empirical formula of an analyzed species. XPS is useful for determining the chemical state and electronic state of the elements that exist within a material.

As used herein, the term "LLZO" refers to a lithium lanthanum zirconium oxide, which when crystallized into the garnet crystal form is referred to as lithium-stuffed garnet as defined above.

As used herein, the term "GITT" refers to the Galvanostatic Intermittent Titration Technique.

As used herein, the term "EIS" refers to Electrochemical Impedance Spectroscopy.

As used herein, the term "ECS" refers to a mixture of ethylene carbonate (EC) and sulfolane. Sulfolane refers to tetrahydrothiophene 1,1-dioxide, having the cyclic sulfone structure shown below:

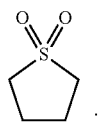

The ratio, EC:sulfolane, is 45:55 vol % unless specified to the contrary. The ratio—EC:sulfolane—may range from 3:7 to 5:5 v/v, but is understood to be 45:55 vol % unless specified otherwise.

As used herein, the term "SCN" refers to succinonitrile.

III. Processes for Making Surface-Treated Lithium-Stuffed Garnet Electrolytes

In some examples, set forth herein is a process for making a sintered lithium-stuffed garnet thin film or pellet having a treated surface, including (1) providing a solution including a fluoride salt and a solvent; (2) providing a sintered lithium-stuffed garnet thin film or pellet; (3) immersing at least one surface of the sintered lithium-stuffed garnet thin film or pellet in the solution at a temperature between, or equal to, 0° C. and 60° C.; and (4) removing the at least one surface of the sintered lithium-stuffed garnet thin film from the solution. In some examples, the process includes (2) providing a sintered lithium-stuffed garnet thin film. In some examples, the process includes (2) providing a sintered lithium-stuffed garnet pellet. In some examples, step (2) includes providing a sintered lithium-stuffed garnet thin film or pellet which has a pristine surface including only lithium-stuffed garnet, as determined by x-ray photoelectron spectroscopy. In some examples, the process includes (2) providing a sintered lithium-stuffed garnet pellet. In some examples, step (2) includes providing a sintered lithium-stuffed garnet thin film or pellet which has an untreated surface. In some examples, step (2) includes providing a sintered lithium-stuffed garnet thin film or pellet which has an annealed surface in which there is no detectable amount of lithium carbonate, lithium hydroxide, or lithium oxide on the surface, as detected by x-ray photoelectron spectroscopy. In some examples, the step of removing the at least one surface of the sintered lithium-stuffed garnet thin film from the solution yields a sintered lithium-stuffed garnet thin film having a fluorinated or oxyfluorinated surface.

In some examples, set forth herein is a process for treating or modifying a sintered lithium-stuffed garnet thin film or pellet having a treated surface, including (1) providing a solution including a fluoride salt and a solvent; (2) providing a sintered lithium-stuffed garnet thin film or pellet; (3) immersing at least one surface of the sintered lithium-stuffed garnet thin film or pellet in the solution at a temperature between, or equal to, 0° C. and 60° C.; and (4) removing the at least one surface of the sintered lithium-stuffed garnet thin film from the solution. In some examples, the process includes (2) providing a sintered lithium-stuffed garnet thin film. In some examples, the process includes (2) providing an untreated sintered lithium-stuffed garnet pellet.

In some examples, including any of the foregoing, the process further includes drying the sintered lithium-stuffed garnet after step (3).

In some examples, including any of the foregoing, the process further includes drying the sintered lithium-stuffed garnet after step (4).

In some examples, including any of the foregoing, the fluoride salt is selected from the group consisting of $LiPF_6$, lithium bis(perfluoroethanesulfonyl)imide (LIBETI), bis(trifluoromethane)sulfonimide lithium salt (LiTFSI), $LiBF_4$, $LiAsF_6$, lithium bis(fluorosulfonyl)imide (LiFSI), $LiAsF_6$, and combinations thereof.

In some examples, including any of the foregoing, the fluoride salt is $LiPF_6$.

In some examples, including any of the foregoing, the fluoride salt is lithium bis(perfluoroethanesulfonyl)imide (LIBETI).

In some examples, including any of the foregoing, the fluoride salt is bis(trifluoromethane)sulfonimide lithium salt (LiTFSI).

In some examples, including any of the foregoing, the fluoride salt is $LiBF_4$.

In some examples, including any of the foregoing, the fluoride salt is $LiAsF_6$.

In some examples, including any of the foregoing, the fluoride salt is lithium bis(fluorosulfonyl)imide (LiFSI).

In some examples, including any of the foregoing, the fluoride salt is $LiBF_4$ or $LiPF_6$.

In some examples, including any of the foregoing, the fluoride salt is $LiBF_4$ and $LiPF_6$.

In some examples, including any of the foregoing, the concentration of fluoride salt in the solution is about 0.5 M to about 1.5 M. In some examples, including any of the foregoing, the concentration is about 0.5 M, about 0.55 M, about 0.6 M, about 0.65 M, about 0.7 M, about 0.75 M, about 0.8 M, about 0.85 M, about 0.9 M, about 0.95 M, about 1.0 M, about 1.05, about 1.10, about 1.15, about 1.2, about 1.25, about 1.30, about 1.35, about 1.4, about 1.45, or about 1.5 M.

In some examples, including any of the foregoing, the concentration of fluoride salt in the solution is about 0.5 M to about 1.5 M. In some examples, including any of the foregoing, the concentration is 0.5 M, 0.55 M, 0.6 M, 0.65 M, 0.7 M, 0.75 M, 0.8 M, 0.85 M, 0.9 M, 0.95 M, 1.0 M, 1.05, 1.10, 1.15, 1.2, 1.25, 1.30, 1.35, 1.4, 1.45, or 1.5 M.

In some examples, including any of the foregoing, the concentration of fluoride salt in the solution is 0.5 M to 1.5 M. In some examples, including any of the foregoing, the concentration is 0.5 M, 0.55 M, 0.6 M, 0.65 M, 0.7 M, 0.75 M, 0.8 M, 0.85 M, 0.9 M, 0.95 M, 1.0 M, 1.05, 1.10, 1.15, 1.2, 1.25, 1.30, 1.35, 1.4, 1.45, or 1.5 M.

In some examples, including any of the foregoing, the concentration is 0.5 M.

In some examples, including any of the foregoing, the concentration is 0.55 M.

In some examples, including any of the foregoing, the concentration is 0.6 M.

In some examples, including any of the foregoing, the concentration is 0.65 M.

In some examples, including any of the foregoing, the concentration is 0.7 M.

In some examples, including any of the foregoing, the concentration is 0.75 M.

In some examples, including any of the foregoing, the concentration is 0.8 M.

In some examples, including any of the foregoing, the concentration is 0.85 M.

In some examples, including any of the foregoing, the concentration is 0.9 M.

In some examples, including any of the foregoing, the concentration is 0.95 M.

In some examples, including any of the foregoing, the concentration is 1.5 M.

In some examples, including any of the foregoing, the concentration is about 0.5 M.

In some examples, including any of the foregoing, the concentration is about 0.55 M.

In some examples, including any of the foregoing, the concentration is about 0.6 M.

In some examples, including any of the foregoing, the concentration is about 0.65 M.

In some examples, including any of the foregoing, the concentration is about 0.7 M.

In some examples, including any of the foregoing, the concentration is about 0.75 M.

In some examples, including any of the foregoing, the concentration is about 0.8 M.

In some examples, including any of the foregoing, the concentration is about 0.85 M.

In some examples, including any of the foregoing, the concentration is about 0.9 M.

In some examples, including any of the foregoing, the concentration is about 0.95 M.

In some examples, including any of the foregoing, the concentration is about 1.5 M.

In some examples, including any of the foregoing, the solvent is selected from the group consisting of ethylene carbonate (EC), diethylene carbonate, dimethyl carbonate (DMC), ethyl-methyl carbonate (EMC), propylmethyl carbonate, nitroethyl carbonate, propylene carbonate (PC), diethyl carbonate (DEC), methyl propyl carbonate (MPC), 2,5-dioxahexanedioic acid dimethyl ester, tetrahydrofuran (THF), γ-butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE), fluorinated cyclic carbonate (F-AEC), dioxolane, prop-1-ene-1,3-sultone (PES), sulfolane, acetonitrile (ACN), succinonitrile (SCN), pimelonitrile, suberonitrile, propionitrile, propanedinitrile, glutaronitrile (GLN), adiponitrile (ADN), hexanedinitrile, pentanedinitrile, acetophenone, isophorone, benzonitrile, ethyl propionate, methyl propionate, methylene methanedisulfonate, dimethyl sulfate, dimethyl sulfoxide (DMSO), ethyl acetate, methyl butyrate, dimethyl ether (DME), diethyl ether, dioxolane, gamma butyl-lactone, methyl benzoate, 2-methyl-5-oxooxolane-2-carbonitrile, and combinations thereof. In some examples, the combinations of solvents are those combinations which are miscible.

In some examples, including any of the foregoing, the solvent is ethylene carbonate (EC).

In some examples, including any of the foregoing, the solvent is diethylene carbonate.

In some examples, including any of the foregoing, the solvent is dimethyl carbonate (DMC).

In some examples, including any of the foregoing, the solvent is ethyl-methyl carbonate (EMC).

In some examples, including any of the foregoing, the solvent is propylmethyl carbonate.

In some examples, including any of the foregoing, the solvent is nitroethyl carbonate.

In some examples, including any of the foregoing, the solvent is propylene carbonate (PC).

In some examples, including any of the foregoing, the solvent is diethyl carbonate (DEC).

In some examples, including any of the foregoing, the solvent is methyl propyl carbonate (MPC).

In some examples, including any of the foregoing, the solvent is 2,5-dioxahexanedioic acid dimethyl ester.

In some examples, including any of the foregoing, the solvent is tetrahydrofuran (THF).

In some examples, including any of the foregoing, the solvent is γ-butyrolactone (GBL).

In some examples, including any of the foregoing, the solvent is fluoroethylene carbonate (FEC).

In some examples, including any of the foregoing, the solvent is fluoromethyl ethylene carbonate (FMEC).

In some examples, including any of the foregoing, the solvent is trifluoroethyl methyl carbonate (F-EMC).

In some examples, including any of the foregoing, the solvent is fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE).

In some examples, including any of the foregoing, the solvent is fluorinated cyclic carbonate (F-AEC).

In some examples, including any of the foregoing, the solvent is dioxolane.

In some examples, including any of the foregoing, the solvent is prop-1-ene-1,3-sultone (PES).

In some examples, including any of the foregoing, the solvent is sulfolane.

In some examples, including any of the foregoing, the solvent is acetonitrile (ACN).

In some examples, including any of the foregoing, the solvent is succinonitrile (SCN).

In some examples, including any of the foregoing, the solvent is pimelonitrile.

In some examples, including any of the foregoing, the solvent is suberonitrile.

In some examples, including any of the foregoing, the solvent is propionitrile.

In some examples, including any of the foregoing, the solvent is propanedinitrile.

In some examples, including any of the foregoing, the solvent is glutaronitrile (GLN).

In some examples, including any of the foregoing, the solvent is adiponitrile (ADN).

In some examples, including any of the foregoing, the solvent is hexanedinitrile.

In some examples, including any of the foregoing, the solvent is pentanedinitrile.

In some examples, including any of the foregoing, the solvent is acetophenone.

In some examples, including any of the foregoing, the solvent is isophorone.

In some examples, including any of the foregoing, the solvent is benzonitrile.

In some examples, including any of the foregoing, the solvent is ethyl propionate.

In some examples, including any of the foregoing, the solvent is methyl propionate.

In some examples, including any of the foregoing, the solvent is methylene methanedisulfonate.

In some examples, including any of the foregoing, the solvent is dimethyl sulfate. dimethyl sulfoxide (DMSO), In some examples, including any of the foregoing, the solvent is ethyl acetate.

In some examples, including any of the foregoing, the solvent is methyl butyrate.

In some examples, including any of the foregoing, the solvent is dimethyl ether (DME).

In some examples, including any of the foregoing, the solvent is diethyl ether.

In some examples, including any of the foregoing, the solvent is dioxolane.

In some examples, including any of the foregoing, the solvent is gamma butyl-lactone.

In some examples, including any of the foregoing, the solvent is methyl benzoate.

In some examples, including any of the foregoing, the solvent is 2-methyl-5-oxooxolane-2-carbonitrile.

In some examples, including any of the foregoing, the solvent is selected from the group consisting of succinonitrile (SCN), glutaronitile (GLN), sulfolane, ethylene carbonate (EC), ethyl-methyl carbonate (EMC), and combinations thereof.

In some examples, including any of the foregoing, the solution is any solution or electrolyte disclosed in US Patent Application Publication No. US20170331092A1, which published Nov. 16, 2017, titled as SOLID ELECTROLYTE SEPARATOR BONDING AGENT, the entire content of the application is incorporated by reference in its entirety for all purposes.

In some examples, including any of the foregoing, the solvent is a combination of SCN and GLN. In some examples, including any of the foregoing, the GLN is about 57 wt % of the solvent combination. In some embodiments, GLN is about 55 wt % to 60 wt % of the solvent combination.

In some examples, including any of the foregoing, the solvent has a water content less than 200 ppm, or less than 150 ppm, or less than 100 ppm, or less than 60 ppm, or less than 50 ppm, or less than 40 ppm, or less than 30 ppm, or less than 20 ppm, or less than 10 ppm. The water content of the solvent or the full electrolyte mixture moisture is measured by Karl Fischer coulometric titration, using a Mettler Toledo C20. The catholyte "Coulomat CG-K" and the anolyte "Hydranal AK" are used in the titration and the electrolyte is directly injected into the system for moisture analysis. Both catholyte and anolyte can be purchased from Fluka.

In some examples, including any of the foregoing, the electrolyte solution is selected from those disclosed in US Patent Application Publication No. US20170331092A1, which published Nov. 16, 2017, titled as SOLID ELECTROLYTE SEPARATOR BONDING AGENT, the entire content of the application is incorporated by reference in its entirety for all purposes.

In some examples, including any of the foregoing, the electrolyte solution comprises or is one of the following solvent and fluoride salt combinations: ECS and $LiPF_6$, SCN and $LiBF_4$, and SCN+GLN and $LiBF_4$.

In some examples, including any of the foregoing, the solvent is a combination of SCN and GLN.

In some examples, including any of the foregoing, the GLN is present at 57 wt % of the solution.

In some examples, including any of the foregoing, the solvent has a water content less than 200 ppm, or less than 150 ppm, or less than 100 ppm, or less than 60 ppm, or less than 50 ppm, or less than 40 ppm, or less than 30 ppm, or less than 20 ppm, or less than 10 ppm.

In some examples, including any of the foregoing, the temperature is selected from the group consisting of about 20° C., about 25° C., about 30° C., about 35° C., about 40° C., about 45° C., about 50° C., about 55° C., and about 60° C.

In some examples, including any of the foregoing, the temperature is about 20° C.

In some examples, including any of the foregoing, the temperature is about 25° C.

In some examples, including any of the foregoing, the temperature is about 30° C.

In some examples, including any of the foregoing, the temperature is about 35° C.

In some examples, including any of the foregoing, the temperature is about 40° C.

In some examples, including any of the foregoing, the temperature is about 45° C.

In some examples, including any of the foregoing, the temperature is about 50° C.

In some examples, including any of the foregoing, the temperature is about 55° C.

In some examples, including any of the foregoing, the temperature is about 60° C.

In some examples, including any of the foregoing, the temperature is selected from the group consisting of 20° C., 25° C., and 30° C. In some embodiments, the at least a surface of a sintered thin film garnet is soaked in the electrolyte solution at a temperature that ranges from about 20 to about 60° C. In some embodiments, the temperature ranges from 20 to 25° C., 20 to 30° C., 20 to 35° C., 20 to 40° C., 20 to 45° C., 20 to 50° C., 25 to 30° C., 25 to 35° C., 25 to 40° C., 30 to 35° C., 30 to 40° C., 35 to 40° C., 35 to 45° C., 35 to 50° C., or 40 to 50° C.

In some embodiments, the temperature is selected from the group consisting of about 20° C., about 25° C., about 30° C., about 35° C., about 40° C., about 45° C., about 50° C., and about 55° C.

In some embodiments, the temperature is selected from the group consisting of 20° C., 25° C., 30° C., 35° C., 40° C., 45° C., 50° C., and 55° C.

In some embodiments, the temperature is 35° C., 40° C., 45° C., 50° C., 55° C., or 60° C.

In some embodiments, the temperature is 60° C.

In some examples, including any of the foregoing, the temperature is 60° C.

In some examples, including any of the foregoing, the lithium-stuffed garnet thin film or pellet, prior to step 3, is characterized by the chemical formula $Li_4La_BAl_CM''_DZr_EO_F$, wherein 5<A<8, 1.5<B<4, 0.1<C<2, 0≤D<2, 1<E<3, 10<F<13, and M" is selected from the group consisting of Mo, W, Nb, Y, Ta, Ga, Sb, Ca, Ba, Sr, Ce, Hf, and Rb. In some examples, M' and M" are the same element selected from the from the group consisting of Al, Mo, W, Nb, Sb, Ca, Ba, Sr, Ce, Hf, Rb, and Ta. However, unless stated explicitly to the contrary, M' and M" are not the same element.

In some examples, including any of the foregoing, the lithium-stuffed garnet thin film or pellet, prior to step 3, is characterized by the chemical formula $Li_xLa_3Zr_2O_{12}$+$yAl_2O_3$, wherein x is from 5.8 to 7.0, and y is 0.1, 0.2, 0.3, 0.4, 0.5, 0.6, 0.7, 0.8, 0.9, or 1.0.

In some examples, including any of the foregoing, the lithium-stuffed garnet thin film or pellet, prior to step 3, is characterized by a formula selected from the group consisting of $Li_4La_BM'_CM''_DZr_EO_F$, $Li_4La_BM'_CM''_DTa_EO_F$, and $Li_4La_BM'_CM''_DNb_EO_F$, wherein 4<A<8.5, 1.5<B<4, 0≤C<2, 0≤D<2; 0<E<2, 10<F<14, and wherein M' and M"

are each, independently, selected from the group consisting of Al, Mo, W, Nb, Sb, Ca, Ba, Sr, Ce, Hf, Rb, and Ta.

In some examples, including any of the foregoing, the lithium-stuffed garnet thin film or pellet, prior to step 3, is characterized by a formula selected from the group consisting of $Li_aLa_bZr_cAl_dMe''_eO_f$ wherein $5<a<7.7$; $2<b<4$; $0<c<2.5$; $0<d<2$; $0\le e<2$, and $10<f<14$, and wherein Me'' is a metal selected from the group consisting of Nb, Ta, V, W, Mo, and Sb.

In some examples, including any of the foregoing, the lithium-stuffed garnet thin film or pellet, prior to step 3, is characterized by a formula selected from the group consisting of $Li_aLa_bZr_cAl_dO_f$ wherein $5<a<7.7$; $2<b<4$; $0<c<2.5$; $0<d<2$; and $10<f<14$.

In some examples, including any of the foregoing, the lithium-stuffed garnet thin film or pellet, prior to step 3, is characterized by a formula selected from the group consisting of $Li_xLa_3Zr_2O_{12}.0.35Al_2O_3$ wherein $4<x<8.5$.

In some examples, including any of the foregoing, the lithium-stuffed garnet thin film or pellet, prior to step 3, is characterized by a formula selected from the group consisting of $Li_xLa_3Zr_2O_{12}.0.5Al_2O_3$ wherein $4<x<8.5$.

In some examples, including any of the foregoing, the lithium-stuffed garnet thin film or pellet, prior to step 3, is characterized by a formula selected from the group consisting of $Li_xLa_3Zr_2O_{12}.0.65Al_2O_3$ wherein $4<x<8.5$.

In some examples, including any of the foregoing, the lithium-stuffed garnet thin film or pellet, prior to step 3, is characterized by a formula selected from the group consisting of $Li_xLa_3Zr_2O_{12}.Al_2O_3$ wherein $4<x<8.5$.

In some examples, including any of the foregoing, the at least one surface of the lithium-stuffed garnet thin film or pellet, after step 4, has a fluorinated surface.

In some examples, including any of the foregoing, the at least one surface of the lithium-stuffed garnet thin film or pellet, after step 4, has an oxyfluorinated surface.

In some examples, including any of the foregoing, the at least one surface of the lithium-stuffed garnet thin film or pellet, after step 4, has both a fluorinated and an oxyfluorinated surface.

In some examples, including any of the foregoing, the at least one surface of the lithium-stuffed garnet thin film or pellet, after step 4, has fluorine or fluoride present at a depth of penetration ranging from about 0.5 µm to about 1.5 µm.

In some examples, including any of the foregoing, the at least one surface of the lithium-stuffed garnet thin film or pellet, after step 4, has fluorine or fluoride present at a depth of penetration selected from the group consisting of about 0.5 µm, 0.6 µm, 0.7 µm, 0.8 µm, 0.9 µm, 1.0 µm, 1.1 µm, 1.2 µm, 1.3 µm, 1.4 µm, and 1.5 µm.

In some examples, including any of the foregoing, the at least one surface of the lithium-stuffed garnet thin film, after step 4, has fluorine or fluoride present at a depth of penetration of about 0.5 µm.

In some examples, including any of the foregoing, the at least one surface of the lithium-stuffed garnet thin film, after step 4, has fluorine or fluoride present at a depth of penetration of about 0.6 µm.

In some examples, including any of the foregoing, the at least one surface of the lithium-stuffed garnet thin film, after step 4, has fluorine or fluoride present at a depth of penetration of about 0.7 µm.

In some examples, including any of the foregoing, the at least one surface of the lithium-stuffed garnet thin film, after step 4, has fluorine or fluoride present at a depth of penetration of about 0.8 µm.

In some examples, including any of the foregoing, the at least one surface of the lithium-stuffed garnet thin film, after step 4, has fluorine or fluoride present at a depth of penetration of about 0.9 µm.

In some examples, including any of the foregoing, the at least one surface of the lithium-stuffed garnet thin film, after step 4, has fluorine or fluoride present at a depth of penetration of about 1.0 µm.

In some examples, including any of the foregoing, the at least one surface of the lithium-stuffed garnet thin film, after step 4, has fluorine or fluoride present at a depth of penetration of about 1.1 µm.

In some examples, including any of the foregoing, the at least one surface of the lithium-stuffed garnet thin film, after step 4, has fluorine or fluoride present at a depth of penetration of about 1.2 µm.

In some examples, including any of the foregoing, the at least one surface of the lithium-stuffed garnet thin film, after step 4, has fluorine or fluoride present at a depth of penetration of about 1.3 µm.

In some examples, including any of the foregoing, the at least one surface of the lithium-stuffed garnet thin film, after step 4, has fluorine or fluoride present at a depth of penetration of about 1.4 µm.

In some examples, including any of the foregoing, the at least one surface of the lithium-stuffed garnet thin film, after step 4, has fluorine or fluoride present at a depth of penetration of about 1.5 µm.

In some examples, including any of the foregoing, the at least one surface of the lithium-stuffed garnet pellet, after step 4, has fluorine or fluoride present at a depth of penetration of about 0.5 µm, 0.6 µm, 0.7 µm, 0.8 µm, 0.9 µm, 1.0 µm, 1.1 µm, 1.2 µm, 1.3 µm, 1.4 µm, and 1.5 µm.

In some examples, including any of the foregoing, the at least one surface of the lithium-stuffed garnet pellet, after step 4, has fluorine or fluoride present at a depth of penetration of about 0.5 µm.

In some examples, including any of the foregoing, the at least one surface of the lithium-stuffed garnet pellet, after step 4, has fluorine or fluoride present at a depth of penetration of about 0.6 µm.

In some examples, including any of the foregoing, the at least one surface of the lithium-stuffed garnet pellet, after step 4, has fluorine or fluoride present at a depth of penetration of about 0.7 µm.

In some examples, including any of the foregoing, the at least one surface of the lithium-stuffed garnet pellet, after step 4, has fluorine or fluoride present at a depth of penetration of about 0.8 µm.

In some examples, including any of the foregoing, the at least one surface of the lithium-stuffed garnet pellet, after step 4, has fluorine or fluoride present at a depth of penetration of about 0.9 µm.

In some examples, including any of the foregoing, the at least one surface of the lithium-stuffed garnet pellet, after step 4, has fluorine or fluoride present at a depth of penetration of about 1.0 µm.

In some examples, including any of the foregoing, the at least one surface of the lithium-stuffed garnet pellet, after step 4, has fluorine or fluoride present at a depth of penetration of about 1.1 µm.

In some examples, including any of the foregoing, the at least one surface of the lithium-stuffed garnet pellet, after step 4, has fluorine or fluoride present at a depth of penetration of about 1.2 µm.

In some examples, including any of the foregoing, the at least one surface of the lithium-stuffed garnet pellet, after step 4, has fluorine or fluoride present at a depth of penetration of about 1.3 µm.

In some examples, including any of the foregoing, the at least one surface of the lithium-stuffed garnet pellet, after step 4, has fluorine or fluoride present at a depth of penetration of about 1.4 µm.

In some examples, including any of the foregoing, the at least one surface of the lithium-stuffed garnet pellet, after step 4, has fluorine or fluoride present at a depth of penetration of about 1.5 µm.

Without being bound by theory, the depth of penetration can be optimized and tuned as a function of immersion time in the solution.

In some examples, including any of the foregoing, the at least one surface of the lithium-stuffed garnet thin film or pellet, after step 4, includes fluorine bonded to one or more elements in the lithium-stuffed garnet.

In some examples, including any of the foregoing, the fluorine is bonded to Al.

In some examples, including any of the foregoing, the fluorine is bonded to Zr.

In some examples, including any of the foregoing, the fluorine is bonded to La.

In some examples, including any of the foregoing, the duration of step 3 ranges from 0.1 hours to 24 hours.

In some examples, including any of the foregoing, the duration of step 3 ranges from a time selected from the group consisting of 0.5 hours, 1 hours, 1.5 hours, 2 hours, 2.5 hours, 3 hours, 3.5 hours, 4 hours, 4.5 hours, 5 hours, 5.5 hours, 6 hours, 6.5 hours, 7 hours, 7.5 hours, and 8 hours.

In some examples, including any of the foregoing, the at least one surface includes a contaminant prior to step 3.

In some examples, including any of the foregoing, the contaminant is selected from the group consisting of hydroxides, peroxides, oxides, carbonates, and combination thereof.

In some examples, including any of the foregoing, the process includes annealing the at least one surface to remove the contaminant prior to step (3).

In some examples, including any of the foregoing, the process includes annealing methods such as, but not limited to, those annealing methods described in US 2017/0214084, entitled ANNEALED GARNET ELECTROLYTE SEPARATORS, and WO/2017/131676, the entire contents of each of these publications are incorporated by reference in their entirety for all purposes.

In some examples, including any of the foregoing, the process includes annealing the at least one surface to reduce the amount of the contaminant prior to step (3).

In some examples, including any of the foregoing, the annealing the surface is in an inert or reducing atmosphere.

In some examples, including any of the foregoing, the at least one surface is free or substantially free of a contaminant after step 3.

In some examples, including any of the foregoing, the contaminant is $Li_2CO_3$.

In some examples, including any of the foregoing, the at least one surface has a lower interfacial resistance after step 4 than before step 3.

In some examples, including any of the foregoing, the at least one surface has a lower ASR after step 4 than before step 3.

In some examples, including any of the foregoing, the at least one surface has an ASR less than 30 $\Omega cm^2$ at 45° C. after step 4. In some embodiments, the at least one surface has an area specific resistance (ASR) less than 100 $\Omega cm^2$ at 45° C. In some embodiments, the ASR is less than 90, 80, 70, 60, 50, 40, 30, 20, or 10 $\Omega cm^2$ at 45° C.

In some embodiments, the at least one surface has an area specific resistance (ASR) less than 30 $\Omega cm^2$ at 45° C. In some embodiments, the at least one surface has an area specific resistance (ASR) less than 10 $\Omega cm^2$ at 45° C. In some embodiments, the at least one surface has an area specific resistance (ASR) less than 5 $\Omega cm^2$ at 45° C. In some embodiments, the at least one surface has an area specific resistance (ASR) less than 30 $\Omega cm^2$ at 25° C. In some embodiments, the at least one surface has an area specific resistance (ASR) less than 10 $\Omega cm^2$ at 25° C.

Figure 3:
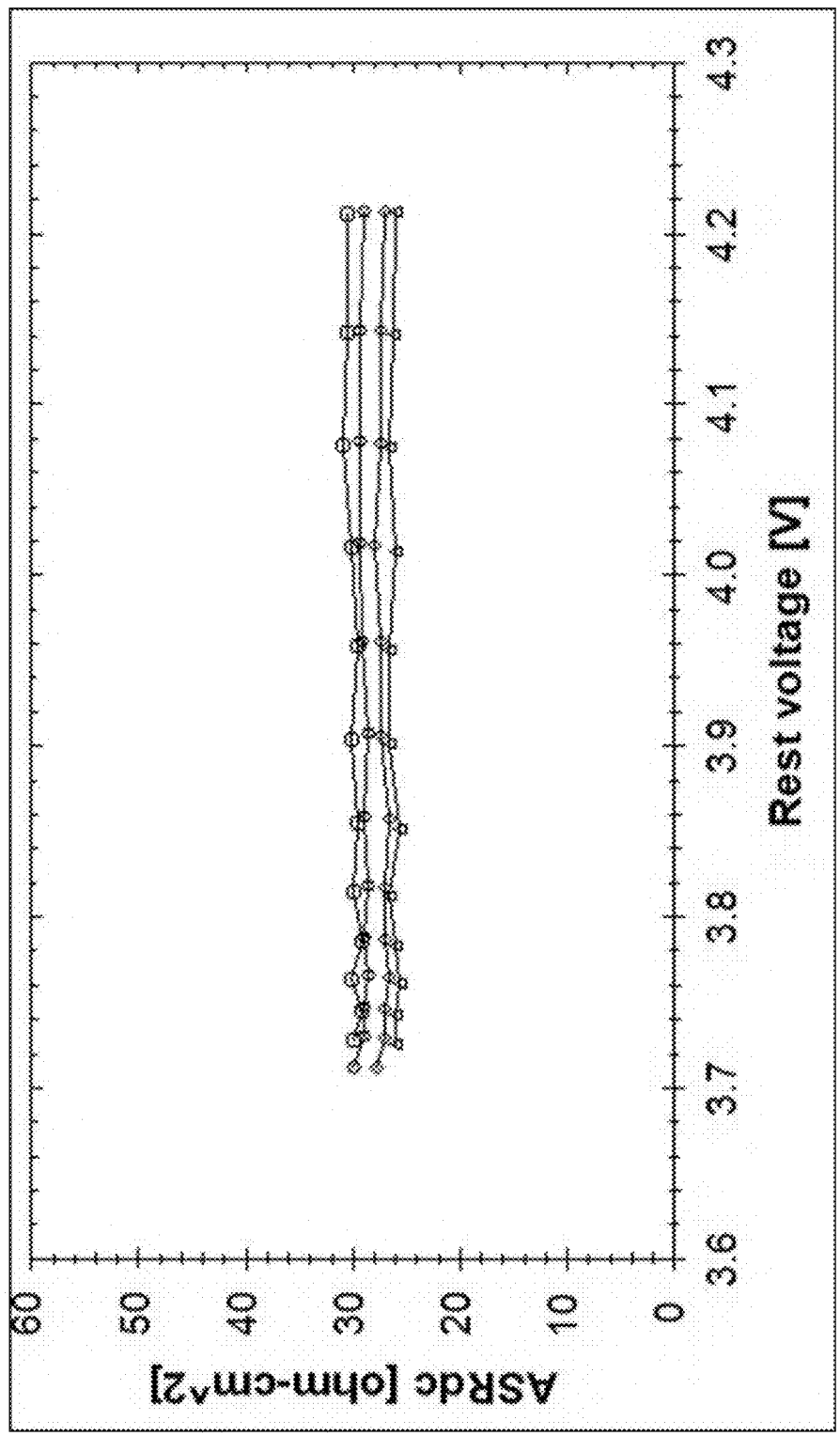
FIG. 3 shows ASR of a full cell using the soaked garnet as a function of rest voltage.

In some embodiments, the at least one surface has an area specific resistance (ASR) substantially as shown in FIG. 3.

In some embodiments, the at least one surface has an ASR stability substantially as shown in FIG. 3. In some embodiments, the at least one surface has an ASR which is more stable when exposed to ambient conditions when compared to a pristine lithium-stuffed garnet surface exposed to the same conditions. In some embodiments, the at least one surface has an ASR which is more stable when exposed to dry room conditions when compared to a pristine lithium-stuffed garnet surface exposed to the same conditions.

In some examples, including any of the foregoing, the at least one surface has a lithium ion conductivity of at least $10^{-4}$ S/cm at 45° C. after step 4.

In some examples, including any of the foregoing, the at least one surface remains free or substantially free of a contaminant in an environment of less than −40° C. dew point for up to 3 days.

In some other examples, set forth herein is a sintered lithium-stuffed garnet thin film made by any process set forth herein.

In some examples, including any of the foregoing, the methods further comprises assembling an electrochemical device which includes the sintered thin film lithium-stuffed garnet thin film or pellet.

IV. Surface-Treated Lithium-Stuffed Garnet Electrolytes

In some examples, set forth herein is a sintered lithium-stuffed garnet thin film or pellet including a top surface and bottom surface and a bulk therebetween, wherein the top surface or bottom surface, or both, comprise fluorine; wherein the fluorine is incorporated into, or bonded to, the lithium-stuffed garnet. In some examples, the sintered lithium-stuffed garnet is a thin film. In some examples, the sintered lithium-stuffed garnet is a pellet.

In some examples, including any of the foregoing, the lithium-stuffed garnet thin film or pellet bulk is characterized by the chemical formula $Li_A La_B Al_C M''_D Zr_E O_F$, wherein $5<A<8$, $1.5<B<4$, $0.1<C<2$, $0 \leq D<2$, $1<E<3$, $10<F<13$, and M" is selected from the group consisting of Mo, W, Nb, Y, Ta, Ga, Sb, Ca, Ba, Sr, Ce, Hf, and Rb.

In some examples, including any of the foregoing, the lithium-stuffed garnet thin film or pellet bulk is characterized by the chemical formula $Li_x La_3 Zr_2 O_{12} + y Al_2 O_3$, wherein x is from 5.8 to 7.0, and y is 0.1, 0.2, 0.3, 0.4, 0.5, 0.6, 0.7, 0.8, 0.9, or 1.0.

In some examples, including any of the foregoing, the lithium-stuffed garnet thin film or pellet bulk is characterized by a formula selected from the group consisting of $Li_A La_B M'_C M''_D Zr_E O_F$, $Li_A La_B M'_C M''_D Ta_E O_F$, and $Li_A La_B M'_C M''_D Nb_E O_F$, wherein $4<A<8.5$, $1.5<B<4$, $0 \leq C<2$, $0 \leq D<2$; $0<E<2$, $10<F<14$, and wherein M' and M" are each, independently, selected from the group consisting of Al, Mo, W, Nb, Sb, Ca, Ba, Sr, Ce, Hf, Rb, and Ta. In some examples, M' and M" are the same member selected from the from the group consisting of Al, Mo, W, Nb, Sb, Ca, Ba, Sr, Ce, Hf, Rb, and Ta. However, unless stated explicitly to the contrary, M' and M" are not the same element.

In some examples, including any of the foregoing, the lithium-stuffed garnet thin film or pellet bulk is characterized by a formula selected from the group consisting of $Li_aLa_bZr_cAl_dMe''_eO_f$ wherein $5<a<7.7$; $2<b<4$; $0<c<2.5$; $0<d<2$; $0\le e<2$, $10<f<14$, and wherein Me" is a metal selected from the group consisting of Nb, Ta, V, W, Mo, and Sb.

In some examples, including any of the foregoing, the lithium-stuffed garnet thin film or pellet bulk is characterized by a formula selected from the group consisting of $Li_aLa_bZr_cAl_dOf$ wherein $5<a<7.7$; $2<b<4$; $0<c<2.5$; $0<d<2$; $10<f<14$.

In some examples, including any of the foregoing, the lithium-stuffed garnet thin film or pellet bulk is characterized by a formula selected from the group consisting of $Li_xLa_3Zr_2O_{12}.0.35Al_2O_3$ wherein $4<x<8.5$.

In some examples, including any of the foregoing, the lithium-stuffed garnet thin film or pellet bulk is characterized by a formula selected from the group consisting of $Li_xLa_3Zr_2O_{12}.0.5Al_2O_3$ wherein $4<x<8.5$.

In some examples, including any of the foregoing, the lithium-stuffed garnet thin film or pellet bulk is characterized by a formula selected from the group consisting of $Li_xLa_3Zr_2O_{12}.0.65Al_2O_3$ wherein $4<x<8.5$.

In some examples, including any of the foregoing, the lithium-stuffed garnet thin film or pellet bulk is characterized by a formula selected from the group consisting of $Li_xLa_3Zr_2O_{12}.Al_2O_3$ wherein $4<x<8.5$.

In some examples, including any of the foregoing, the at least one surface of the lithium-stuffed garnet thin film or pellet has a fluorinated surface.

In some examples, including any of the foregoing, the at least one surface of the lithium-stuffed garnet thin film or pellet has an oxyfluorinated surface.

In some examples, including any of the foregoing, the at least one surface of the lithium-stuffed garnet thin film or pellet has both a fluorinated and an oxyfluorinated surface.

In some examples, including any of the foregoing, the at least one surface of the lithium-stuffed garnet thin film or pellet has fluorine or fluoride present at a depth of penetration ranging from about 0.5 µm to about 1.5 µm.

In some examples, including any of the foregoing, the at least one surface of the lithium-stuffed garnet thin film or pellet has fluorine or fluoride present at a depth of penetration selected from the group consisting of about 0.5 µm, 0.6 µm, 0.7 µm, 0.8 µm, 0.9 µm, 1.0 µm, 1.1 µm, 1.2 µm, 1.3 µm, 1.4 µm, and 1.5 µm.

In some examples, including any of the foregoing, the at least one surface of the lithium-stuffed garnet thin film has fluorine or fluoride present at a depth of penetration of about 0.5 µm.

In some examples, including any of the foregoing, the at least one surface of the lithium-stuffed garnet thin film, after step 4, has fluorine or fluoride present at a depth of penetration of about 0.6 µm.

In some examples, including any of the foregoing, the at least one surface of the lithium-stuffed garnet thin film has fluorine or fluoride present at a depth of penetration of about 0.7 µm.

In some examples, including any of the foregoing, the at least one surface of the lithium-stuffed garnet thin film has fluorine or fluoride present at a depth of penetration of about 0.8 µm.

In some examples, including any of the foregoing, the at least one surface of the lithium-stuffed garnet thin film has fluorine or fluoride present at a depth of penetration of about 0.9 µm.

In some examples, including any of the foregoing, the at least one surface of the lithium-stuffed garnet thin film has fluorine or fluoride present at a depth of penetration of about 1.0 µm.

In some examples, including any of the foregoing, the at least one surface of the lithium-stuffed garnet thin film has fluorine or fluoride present at a depth of penetration of about 1.1 µm.

In some examples, including any of the foregoing, the at least one surface of the lithium-stuffed garnet thin film has fluorine or fluoride present at a depth of penetration of about 1.2 µm.

In some examples, including any of the foregoing, the at least one surface of the lithium-stuffed garnet thin film has fluorine or fluoride present at a depth of penetration of about 1.3 µm.

In some examples, including any of the foregoing, the at least one surface of the lithium-stuffed garnet thin film has fluorine or fluoride present at a depth of penetration of about 1.4 µm.

In some examples, including any of the foregoing, the at least one surface of the lithium-stuffed garnet thin film has fluorine or fluoride present at a depth of penetration of about 1.5 µm.

In some examples, including any of the foregoing, the at least one surface of the lithium-stuffed garnet pellet has fluorine or fluoride present at a depth of penetration of about 0.5 µm, 0.6 µm, 0.7 µm, 0.8 µm, 0.9 µm, 1.0 µm, 1.1 µm, 1.2 µm, 1.3 µm, 1.4 µm, and 1.5 µm.

In some examples, including any of the foregoing, the at least one surface of the lithium-stuffed garnet pellet has fluorine or fluoride present at a depth of penetration of about 0.5 µm.

In some examples, including any of the foregoing, the at least one surface of the lithium-stuffed garnet pellet has fluorine or fluoride present at a depth of penetration of about 0.6 µm.

In some examples, including any of the foregoing, the at least one surface of the lithium-stuffed garnet pellet has fluorine or fluoride present at a depth of penetration of about 0.7 µm.

In some examples, including any of the foregoing, the at least one surface of the lithium-stuffed garnet pellet has fluorine or fluoride present at a depth of penetration of about 0.8 µm.

In some examples, including any of the foregoing, the at least one surface of the lithium-stuffed garnet pellet has fluorine or fluoride present at a depth of penetration of about 0.9 µm.

In some examples, including any of the foregoing, the at least one surface of the lithium-stuffed garnet pellet has fluorine or fluoride present at a depth of penetration of about 1.0 µm.

In some examples, including any of the foregoing, the at least one surface of the lithium-stuffed garnet pellet has fluorine or fluoride present at a depth of penetration of about 1.1 µm.

In some examples, including any of the foregoing, the at least one surface of the lithium-stuffed garnet pellet has fluorine or fluoride present at a depth of penetration of about 1.2 µm.

In some examples, including any of the foregoing, the at least one surface of the lithium-stuffed garnet pellet has fluorine or fluoride present at a depth of penetration of about 1.3 µm.

In some examples, including any of the foregoing, the at least one surface of the lithium-stuffed garnet pellet has fluorine or fluoride present at a depth of penetration of about 1.4 µm.

In some examples, including any of the foregoing, the at least one surface of the lithium-stuffed garnet pellet has fluorine or fluoride present at a depth of penetration of about 1.5 µm.

Without being bound by theory, the depth of penetration can be optimized and tuned as a function of immersion time in the solution.

In some examples, including any of the foregoing, the at least one surface of the lithium-stuffed garnet thin film or pellet includes fluorine bonded to one or more elements in the lithium-stuffed garnet.

In some examples, including any of the foregoing, the fluorine is bonded to Al.

In some examples, including any of the foregoing, the fluorine is bonded to Zr.

In some examples, including any of the foregoing, the fluorine is bonded to La.

In some examples, including any of the foregoing, the bulk has less than 0.5 atomic percent fluorine as measured by XPS.

In some examples, including any of the foregoing, the top or bottom surface has a thickness of about 1 nm to 10 µm. In some examples, including any of the foregoing, the top or bottom surface has a thickness of about 1 nm. In some examples, including any of the foregoing, the top or bottom surface has a thickness of about 2 nm. In some examples, including any of the foregoing, the top or bottom surface has a thickness of about 3 nm. In some examples, including any of the foregoing, the top or bottom surface has a thickness of about 4 nm. In some examples, including any of the foregoing, the top or bottom surface has a thickness of about 5 nm. In some examples, including any of the foregoing, the top or bottom surface has a thickness of about 6 nm. In some examples, including any of the foregoing, the top or bottom surface has a thickness of about 7 nm. In some examples, including any of the foregoing, the top or bottom surface has a thickness of about 8 nm. In some examples, including any of the foregoing, the top or bottom surface has a thickness of about 9 nm. In some examples, including any of the foregoing, the top or bottom surface has a thickness of about 10 nm. In some examples, including any of the foregoing, the top or bottom surface has a thickness of about 11 nm. In some examples, including any of the foregoing, the top or bottom surface has a thickness of about 12 nm. In some examples, including any of the foregoing, the top or bottom surface has a thickness of about 13 nm. In some examples, including any of the foregoing, the top or bottom surface has a thickness of about 14 nm. In some examples, including any of the foregoing, the top or bottom surface has a thickness of about 15 nm. In some examples, including any of the foregoing, the top or bottom surface has a thickness of about 20 nm. In some examples, including any of the foregoing, the top or bottom surface has a thickness of about 25 nm. In some examples, including any of the foregoing, the top or bottom surface has a thickness of about 30 nm. In some examples, including any of the foregoing, the top or bottom surface has a thickness of about 35 nm. In some examples, including any of the foregoing, the top or bottom surface has a thickness of about 40 nm. In some examples, including any of the foregoing, the top or bottom surface has a thickness of about 45 nm. In some examples, including any of the foregoing, the top or bottom surface has a thickness of about 50 nm. In some examples, including any of the foregoing, the top or bottom surface has a thickness of about 55 nm. In some examples, including any of the foregoing, the top or bottom surface has a thickness of about 60 nm. In some examples, including any of the foregoing, the top or bottom surface has a thickness of about 65 nm. In some examples, including any of the foregoing, the top or bottom surface has a thickness of about 70 nm. In some examples, including any of the foregoing, the top or bottom surface has a thickness of about 75 nm. In some examples, including any of the foregoing, the top or bottom surface In some examples, including any of the foregoing, the top or bottom surface has a thickness of about 85 nm. In some examples, including any of the foregoing, the top or bottom surface has a thickness of about 80 nm. has a thickness of about 90 nm. In some examples, including any of the foregoing, the top or bottom surface has a thickness of about 95 nm. In some examples, including any of the foregoing, the top or bottom surface has a thickness of about 100 nm. In some examples, including any of the foregoing, the top or bottom surface has a thickness of about 200 nm. In some examples, including any of the foregoing, the top or bottom surface has a thickness of about 300 nm. In some examples, including any of the foregoing, the top or bottom surface has a thickness of about 400 nm. In some examples, including any of the foregoing, the top or bottom surface has a thickness of about 500 nm. In some examples, including any of the foregoing, the top or bottom surface has a thickness of about 600 nm. In some examples, including any of the foregoing, the top or bottom surface has a thickness of about 700 nm. In some examples, including any of the foregoing, the top or bottom surface has a thickness of about 800 nm. In some examples, including any of the foregoing, the top or bottom surface has a thickness of about 900 nm. In some examples, including any of the foregoing, the top or bottom surface has a thickness of about 1000 nm. In some examples, including any of the foregoing, the top or bottom surface has a thickness of about 2 µm. In some examples, including any of the foregoing, the top or bottom surface has a thickness of about 3 µm. In some examples, including any of the foregoing, the top or bottom surface has a thickness of about 4 µm. In some examples, including any of the foregoing, the top or bottom surface has a thickness of about 5 µm. In some examples, including any of the foregoing, the top or bottom surface has a thickness of about 6 µm. In some examples, including any of the foregoing, the top or bottom surface has a thickness of about 7 µm. In some examples, including any of the foregoing, the top or bottom surface has a thickness of about 8 µm. In some examples, including any of the foregoing, the top or bottom surface has a thickness of about 9 µm. In some examples, including any of the foregoing, the top or bottom surface has a thickness of about 10 µm.

In some examples, including any of the foregoing, the top or bottom surface has a thickness of 1 nm to 10 µm. In some examples, including any of the foregoing, the top or bottom surface has a thickness of 1 nm. In some examples, including any of the foregoing, the top or bottom surface has a thickness of 2 nm. In some examples, including any of the foregoing, the top or bottom surface has a thickness of 3 nm. In some examples, including any of the foregoing, the top or bottom surface has a thickness of 4 nm. In some examples, including any of the foregoing, the top or bottom surface has a thickness of 5 nm. In some examples, including any of the foregoing, the top or bottom surface has a thickness of 6 nm. In some examples, including any of the foregoing, the top or bottom surface has a thickness of 7 nm. In some examples, including any of the foregoing, the top or bottom surface has a thickness of 8 nm. In some examples, including any of the foregoing, the top or bottom surface has a thickness of 9 nm. In some examples, including any of the foregoing, the top or bottom surface has a thickness of 10 nm. In some examples, including any of the foregoing, the top or bottom surface has a thickness of 11 nm. In some examples, including any of the foregoing, the top or bottom surface has a thickness of 12 nm. In some examples, including any of the foregoing, the top or bottom surface has a thickness of 13 nm. In some examples, including any of the foregoing, the top or bottom surface has a thickness of 14 nm. In some examples, including any of the foregoing, the top or bottom surface has a thickness of 15 nm. In some examples, including any of the foregoing, the top or bottom surface has a thickness of 20 nm. In some examples, including any of the foregoing, the top or bottom surface has a thickness of 25 nm. In some examples, including any of the foregoing, the top or bottom surface has a thickness of 30 nm. In some examples, including any of the foregoing, the top or bottom surface has a thickness of 35 nm. In some examples, including any of the foregoing, the top or bottom surface has a thickness of 40 nm. In some examples, including any of the foregoing, the top or bottom surface has a thickness of 45 nm. In some examples, including any of the foregoing, the top or bottom surface has a thickness of 50 nm. In some examples, including any of the foregoing, the top or bottom surface has a thickness of 55 nm. In some examples, including any of the foregoing, the top or bottom surface has a thickness of 60 nm. In some examples, including any of the foregoing, the top or bottom surface has a thickness of 65 nm. In some examples, including any of the foregoing, the top or bottom surface has a thickness of 70 nm. In some examples, including any of the foregoing, the top or bottom surface has a thickness of 75 nm. In some examples, including any of the foregoing, the top or bottom surface In some examples, including any of the foregoing, the top or bottom surface has a thickness of 85 nm. In some examples, including any of the foregoing, the top or bottom surface has a thickness of 80 nm. has a thickness of 90 nm. In some examples, including any of the foregoing, the top or bottom surface has a thickness of 95 nm. In some examples, including any of the foregoing, the top or bottom surface has a thickness of 100 nm. In some examples, including any of the foregoing, the top or bottom surface has a thickness of 200 nm. In some examples, including any of the foregoing, the top or bottom surface has a thickness of 300 nm. In some examples, including any of the foregoing, the top or bottom surface has a thickness of 400 nm. In some examples, including any of the foregoing, the top or bottom surface has a thickness of 500 nm. In some examples, including any of the foregoing, the top or bottom surface has a thickness of 600 nm. In some examples, including any of the foregoing, the top or bottom surface has a thickness of 700 nm. In some examples, including any of the foregoing, the top or bottom surface has a thickness of 800 nm. In some examples, including any of the foregoing, the top or bottom surface has a thickness of 900 nm. In some examples, including any of the foregoing, the top or bottom surface has a thickness of 1000 nm. In some examples, including any of the foregoing, the top or bottom surface has a thickness of 2 µm. In some examples, including any of the foregoing, the top or bottom surface has a thickness of 3 µm. In some examples, including any of the foregoing, the top or bottom surface has a thickness of 4 µm. In some examples, including any of the foregoing, the top or bottom surface has a thickness of 5 µm. In some examples, including any of the foregoing, the top or bottom surface has a thickness of 6 µm. In some examples, including any of the foregoing, the top or bottom surface has a thickness of 7 µm. In some examples, including any of the foregoing, the top or bottom surface has a thickness of 8 µm. In some examples, including any of the foregoing, the top or bottom surface has a thickness of 9 µm. In some examples, including any of the foregoing, the top or bottom surface has a thickness of 10 µm.

In some examples, including any of the foregoing, the top and bottom surface has a thickness of about 1 nm to 10 µm.

In some examples, including any of the foregoing, the sintered lithium-stuffed garnet is a thin film.

In some examples, including any of the foregoing, the sintered lithium-stuffed garnet is a pellet.

In some examples, including any of the foregoing, the top surface or bottom surface, or both, remain free or substantially free of a contaminant after exposure to ambient conditions for 1 day.

In some examples, including any of the foregoing, the top surface or bottom surface, or both, remain free or substantially free of a contaminant after exposure to ambient conditions for 1 day to 5 days.

In some examples, including any of the foregoing, the top surface or bottom surface, or both, remain free or substantially free of a contaminant after exposure to ambient conditions for 1 day to 365 days.

In some examples, including any of the foregoing, the contaminant is selected from the group consisting of hydroxides, peroxides, oxides, carbonates, and combination thereof.

In some examples, including any of the foregoing, the surface comprising fluorine is stable in ambient environment up to 3 days. In some embodiments, the surface comprising fluorine has less than 10% of surface $Li_2CO_3$ as measured by XPS after exposure to room temperature and a dew point of less than −10° C. for 3 days.

In some examples, including any of the foregoing, the contaminant is $Li_2CO_3$.

In some examples, including any of the foregoing, the top or bottom surface, or both, includes less than 10 atomic % $Li_2CO_3$ as measured by XPS after exposure to room temperature and a dew point of less than −10° C. for 3 days.

In some examples, including any of the foregoing, the top or bottom surface, or both, has an area specific resistance (ASR) less than 100 $\Omega cm^2$ at 45° C.

In some examples, including any of the foregoing, the top or bottom surface, or both, has an area specific resistance (ASR) less than 30 $\Omega cm^2$ at 45° C.

In some examples, including any of the foregoing, the top or bottom surface, or both, has an area specific resistance (ASR) less than 10 $\Omega cm^2$ at 25° C.

In some examples, including any of the foregoing, the top or bottom surface, or both, has a lithium ion conductivity of at least $10^{-4}$ S/cm at 45° C.

In some examples, including any of the foregoing, the top or bottom surface, or both, includes trace amounts of contaminants.

In some examples, including any of the foregoing, set forth herein is a sintered thin film lithium-stuffed garnet comprising a top surface and bottom surface and a bulk therebetween, wherein the top surface or bottom surface, or both, comprise fluorine which is incorporated into, or bonded to, the garnet; wherein the bulk has less than 0.5 atomic percent (at %) fluorine as measured by XPS. In some examples, the bulk has 0.4 at %, 0.3 at %, 0.2 at %, or 0.1 at % fluorine as measured by XPS. In some examples, the bulk has less than 0.4 at %, 0.3 at %, 0.2 at %, or 0.1 at % fluorine as measured by XPS.

In some examples, including any of the foregoing, of the sintered thin film lithium-stuffed garnet, the top surface or bottom surface, or both, are free or substantially free of a contaminant.

In some examples, including any of the foregoing, the top surface or bottom surface, or both, remain free or substantially free of a contaminant after exposure to ambient conditions for 1 day.

In some examples, including any of the foregoing, the top surface or bottom surface, or both, remain free or substantially free of a contaminant after exposure to ambient conditions for 1 day to 5 days.

In some examples, including any of the foregoing, the top surface or bottom surface, or both, remain free or substantially free of a contaminant after exposure to ambient conditions for 1 day to 1 year.

In some examples, including any of the foregoing, the contaminant is selected from the group consisting of hydroxides, peroxides, oxides, carbonates, and combinations thereof.

In some examples, including any of the foregoing, the surface comprising fluorine has an area specific resistance (ASR) less than 100 $\Omega cm^2$ at 45° C. In some examples, the surface comprising fluorine has an ASR less than 90, 80, 70, 60, 50, 40, 30, 20, or 10 $\Omega cm^2$ at 45° C.

In some examples, including any of the foregoing, the surface comprising fluorine has an area specific resistance (ASR) less than 30 $\Omega cm^2$ at 45° C. In some examples, the surface comprising fluorine has an area specific resistance (ASR) less than 10 $\Omega cm^2$ at 45° C. In some examples, the surface comprising fluorine has an area specific resistance (ASR) less than 5 $\Omega cm^2$ at 45° C. In some examples, the surface comprising fluorine has an area specific resistance (ASR) less than 30 $\Omega cm^2$ at 25° C. In some examples, the surface comprising fluorine has an area specific resistance (ASR) less than 10 $\Omega cm^2$ at 25° C.

In some examples, including any of the foregoing, the surface comprising fluorine has an area specific resistance (ASR) as shown in FIG. 3. In some examples, including any of the foregoing, the surface comprising fluorine has an area specific resistance (ASR) stability as shown in FIG. 3. In some examples, the surface comprising fluorine has an area specific resistance (ASR) less than 10 $\Omega cm^2$ at 25° C.

In some examples, including any of the foregoing, the surface comprising fluorine has a lithium ion conductivity of at least $10^{-4}$ S/cm at 45° C.

In some examples, including any of the foregoing, the top surface or bottom surface, or both, are fluorinated and comprise trace amounts of contaminants. In some examples, the trace amount of contaminant is less than 1.0 wt %, 0.9 wt %, 0.8 wt %, 0.7 wt %, 0.6 wt %, 0.5 wt %, 0.4 wt %, 0.3 wt %, 0.2 wt %, or 0.1 wt %.

V. Method of Using a Surface-Treated Solid-State Electrolyte

In some examples, set forth herein is a method including, providing a sintered thin film lithium-stuffed garnet film or pellet set forth herein; exposing the sintered thin film lithium-stuffed garnet thin film or pellet to ambient conditions; and measuring the ASR of the sintered thin film lithium-stuffed garnet. In some examples, the measuring occurs in a dry room. In some examples, the measuring is accomplished by electrical impedance spectroscopy (EIS).

In some examples, including any of the foregoing, the ASR does not vary by more than 10% over a surface area of at least 10 $mm^2$.

In some examples, including any of the foregoing, the ASR does not vary by more than 10% as a function of time for at least 1 day.

In some examples, including any of the foregoing, the ASR does not vary by more than 10% as a function of time for at least 365 days.

In some examples, including any of the foregoing, the ASR of the sintered thin film lithium-stuffed garnet after exposure to ambient conditions did not increase by more than 10%.

VI. Devices and Vehicles

In some examples, set forth herein is an electrochemical device including a sintered lithium-stuffed garnet thin film set forth herein.

In some examples, set forth herein is an electric vehicle including an electrochemical device set forth herein.

In some examples, set forth herein is an electric vehicle including an electrochemical device which includes a sintered lithium-stuffed garnet thin film set forth herein.

In some examples, set forth herein is an electric vehicle which includes a sintered lithium-stuffed garnet thin film set forth herein.

EXAMPLES

X-ray photoelectron spectroscopy (XPS) measurements were performed on a Thermo Scientific Model K-Alpha 1 XPS instrument. Monochromatic and Al X-ray source with X-ray energy of 1486.6 eV was used with a spot size of 400 µm. The base pressure when the measurement was conducted is $2*10^{-9}$ mbar or below.

Fluorine-19 ($^{19}F$) solid-state NMR measurements were performed at 25° C. on a Bruker NMR Spectrometer operating at 470.5 MHz $^{19}F$ NMR frequency. The MAS (Magic Angle Spinning) at high spinning speed (up to 30 kHz) was used to reduce NMR line widths. The chemical shifts were referenced with respect to trichlorofluoromethane ($CFC_{13}$) with the fluorine peak set to 0 ppm.

Example 1

Electrolyte Solution Cleaning Effect on Lithium-Stuffed Garnet Thin Film Surface This Example demonstrates a process for removing surface contaminants from the surface of LLZO thin films.

LLZO thin films were prepared as follows. Certain procedures in U.S. application Ser. No. 15/007,908 filed on Jan. 27, 2016 and published as U.S. 2017/0214048 on Jul. 27, 2017, entitled ANNEALED GARNET ELECTROLYTE SEPARATORS, the entire contents of which are herein incorporated by reference in their entirety for all purposes, were incorporated.

Lithium-Stuffed Garnet Powder was prepared. Calcined lithium-stuffed garnet powder was produced by the following series of steps. First, lithium hydroxide (LiOH), aluminum nitrate [$Al(NO_3)_3 9H_2O$], zirconia ($ZrO_2$), and lanthanum oxide ($La_2O_3$) were massed (i.e., weighed) and mixed into a combination wherein the molar ratio of the constituent elements was $Li_{7.1}Zr_2La_3O_{12}+0.5Al_2O_3$. This combination was mixed and milled, using wet-milling techniques and $ZrO_2$ milling media, until the combination had a $d_{50}$ particle size of 100 nm-5 μm. Also included with the milling media was a menhaden fish oil dispersant. The milled combination of reactants was separated from the milling media after milling. The $d_{50}$ particle size of the milled reactants was assessed. The separated milled reactants was then placed in an alumina crucible and calcined at about nine-hundred degrees Celsius (900° C.) for approximately six (6) hours in an oven with a controlled oxidizing atmosphere in contact with the calcining reactants. The calcination process burned and/or combusted residual solvents as well as the dispersant, binder, and surfactant. The calcination caused the inorganic reactants to react to form the lithium-stuffed garnet. The calcined product was removed from the alumina crucibles after it cooled to room temperature. The product is characterized by a variety of analytical techniques, including x-ray powder diffraction (XRD) and scanning electron microscopy. This product is referred to as calcined lithium-stuffed garnet and has an empirical formula of approximately was $Li_{7.1}Zr_2La_3O_{12}+0.5Al_2O_3$.

The milled and calcined product were then mixed with a plasticizer (S160), a binder (B72). Alternatively, an acrylic, polyvinylbuturate (PVB), or polyvinylacetate (PVA) may be used. The solvent was a mixture of dimethyl ether/tetrahydrofuran (DME/THF). The organic components constituted 10-20 weight percent of the slurry. The remainder of the slurry was the solid calcined lithium-stuffed garnet having the empirical formula of approximately $Li_{7.1}Zr_2La_3O_{12}+0.5Al_2O_3$.

The slurry mixture was then tape cast using a doctor blade setting of 20 μm-400 μm to produce 10 μm-200 μm thin films of calcined but unsintered lithium-stuffed garnet in combination with surfactants, binders, plasticizers, and dispersants.

The tape cast thin films were allowed to dry. These dry calcined but unsintered thin films are referred to as green films.

The green films were placed between garnet ceramic setter plates and calcined in an oven filled with an Argon:$H_2O$ mixture followed by an Argon:$H_2$ mixture and heated to 1200° C. for six (6) hours. Setter plates were used as substantially set forth in International PCT Patent Application No. PCT/US16/27886, filed Apr. 15, 2017, entitled LITHIUM STUFFED GARNET SETTER PLATES FOR SOLID ELECTROLYTE FABRICATION, the entire contents of which are herein incorporated by reference in their entirety for all purposes. The setter plates were made primarily of lithium-stuffed garnet formed into a setter. In some samples, the green films were sintered at 1125° C. for 6 hours in an oven with a controlled atmosphere in contact with the calcining reactants.

The sintered films were then exposed to air for 24-48 hours at room temperature, which resulted in the formation of $Li_2CO_3$ on the surface of the thin films. The sintered films with $Li_2CO_3$ on their surface were then placed in either a dry room or glove box for further processing with the solutions in Table 1.

The solutions in Table 1 were prepared.

TABLE 1

Combination of electrolytic solution (solution + salt) and cleaning effect

| Solvent system | Salt (Concentration) | cleaning effect observed |
| --- | --- | --- |
| Succinonitrile (SCN) | $LiBF_4$ (12 mol %) | Yes |
| SCN + GLN | $LiBF_4$ (12 mol %) | Yes |
| ECS | $LiPF_6$ (1M) | Yes |
| ECS | $LiBF_4$ (1M) | Yes |
| EC-EMC | $LiPF_6$ (1M) | Minimal |

*Glutaronitrile (GLN); ethylene carbonate and sulfolane (ECS) and ethylene carbonate-ethyl-methyl carbonate (EC-EMC).

The sintered films were individually soaked in the solutions in Table 1 at 60° C. for 12 hours. After soaking, the films were removed and dried/wiped with a Kimwipe. Then the sintered films were rinsed with isopropanol (i.e., isopropyl alcohol or IPA) and then dried in the dry room or glove box (GB).

Dry room condition were −40° C. humidity and RT (room temperature). GB conditions were argon with a $O_2$ partial pressure of less than 10 ppm and a $H_2O$ partial pressure of 0.1 ppm.

A non-soaked sintered film was used as a control.

The sintered films, with and without exposure to the solutions in Table 1, were analyzed by x-ray photoelectron spectroscopy (XPS) scan between 0 and 1000 eV. The binding energy of each film was measured. The result is shown in FIG. 1.

FIG. 1 shows the binding energy data of the surfaces of the films having been treated as follows:
(a) Non-soaked control,
(b) Soaked in ECS $LiPF_6$ electrolyte solution,
(c) Soaked in SCN $LiBF_4$ electrolyte solution,
(d) Soaked in dinitrile (SCN+GLN) $LiBF_4$ electrolyte solution.

The data in FIG. 1 demonstrates that the $Li_2CO_3$ on the surface of LLZO can be removed by exposure to the solutions in Table 1.

FIG. 1 shows the results of treating sintered lithium-stuffed garnet with solutions that include either $LiPF_6$ or $LiBF_4$ fluoride salts and that include ECS, SCN solvents or combinations thereof. FIG. 1 shows, in (a), $CO_3$ binding energy peak at 289.8 eV which is assigned to carbon from $Li_2CO_3$. This peak disappears in the treated samples b-d. As carbon of the carbonate peak diminishes, lanthanum (La 4d around 102 eV), Zirconia (3d around 182 eV), and Fluorine (around 691 eV) peaks were observed.

Example 2—Exposure Study of Clean/Soaked Films

LLZO thin films were prepared according to Example 1.

One sintered thin film was immersed in an electrolyte solution of SCN and $LiBF_4$ (12 mol %) at 60° C. for 12 hours. This film is referred to as the treated film.

One sintered thin film was left untreated.

Figure 2:
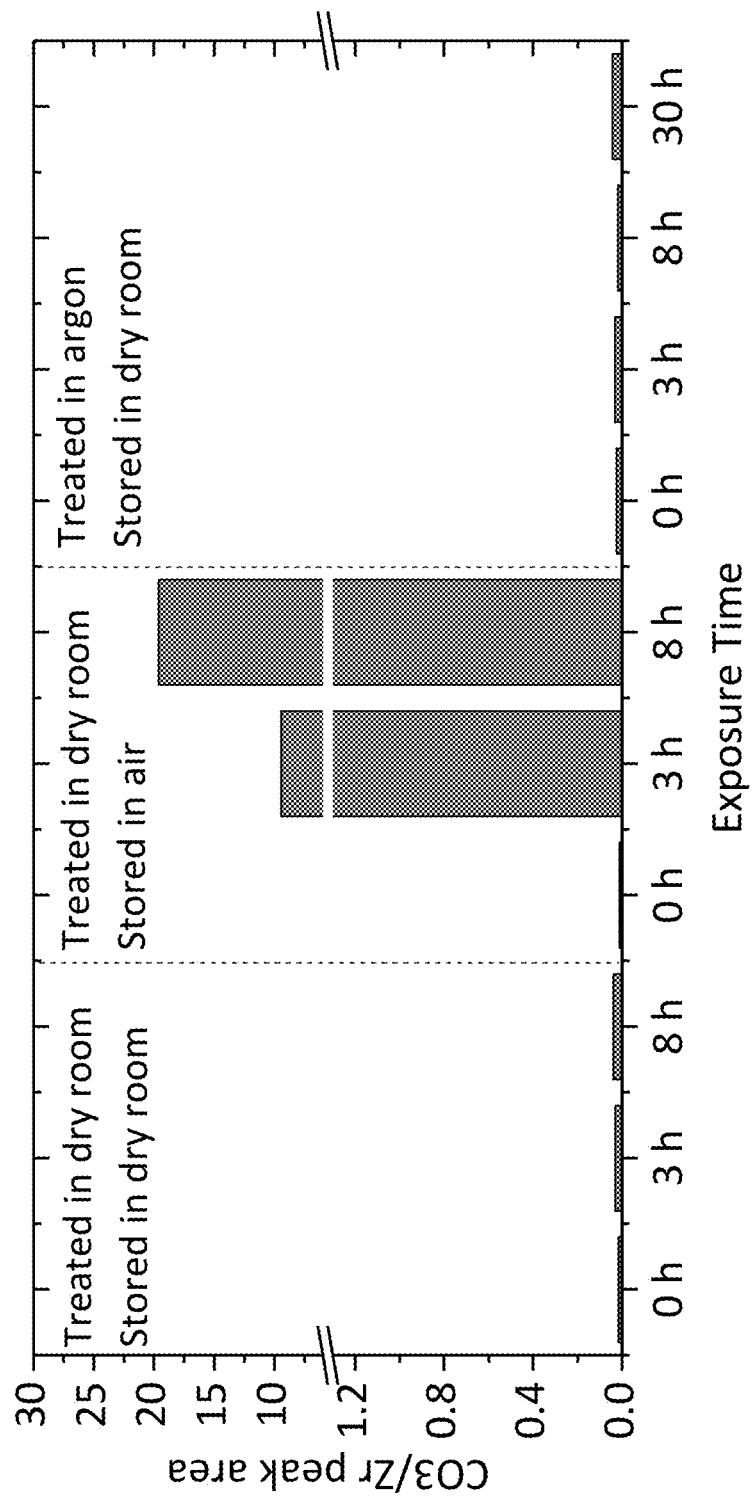
FIG. 2 shows X-ray photoelectron spectroscopy (XPS) results for the sintered thin films described in Example 2. The plot shows the relative amount of $CO_3$ present, with respect to Zr present, at the surface of a lithium-stuffed garnet sintered thin film as a function of the exposure time.

Both the treated film sample and the untreated film sample were stored in a dry room as well as in a glove box for 0, 3, and 8 hours. The $CO_3$/Zr peak area ratio for each film was measured by XPS as a function of exposure time in either the dry room or in the glove box. The result for the treated is shown in FIG. 2. The results for the treated and untreated samples are summarized in the following table:

| $CO_3$/Zr peak area | Time | Treatment |
|---|---|---|
| Stored in dry room for: | 0 h | ~0 |
| Stored in dry room for: | 3 h | 0.04 |
| Stored in dry room for: | 8 h | 0.08 |
| Stored in air for: | 0 h | ~0 |
| Stored in air for: | 3 h | 8 |
| Stored in air for: | 8 h | 20 |

| $CO_3$/Zr peak area | Time | No treatment (i.e., untreated) |
|---|---|---|
| Stored in dry room for: | 0 h | ~0 |
| Stored in dry room for: | 5 min | 12 |
| Stored in dry room for: | 1.25 h | 18 |
| Stored in dry room for: | 24 h | 22 |

FIG. 2 shows an exposure study of untreated and treated samples exposed in argon and dry room environments for 0, 3 and 8 hours. The result shows that the treated surface is stable for at least 30 hours in dry room environments, i.e., room temperature and −40° C. dew point, whereas the untreated surface forms lithium carbonate during the exposure time. Soaking the sintered thin film in the solution in this Example passivated the surface against forming lithium carbonate.

Example 3—ASR Study of a Full Cell Using the Treated Samples from Examples 1 and 2

Figure 6:
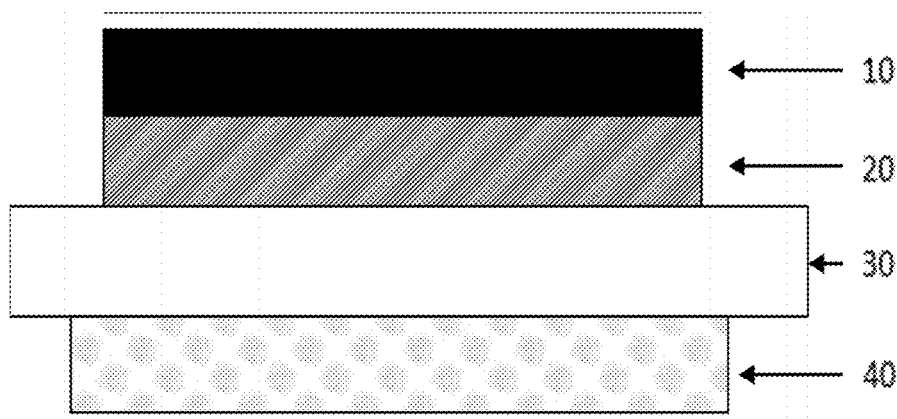
FIG. 6 shows an illustration of an electrochemical cell made and tested in Example 3.

Electrochemical cells were assembled in which the treated samples from Examples 1 and 2 were used as the solid-state electrolyte separator, as illustrated in FIG. 6.

FIG. 6 shows an illustration of a full cell architecture containing a gel bonding layer (1M ECS/LiPF$_6$ in contact with the positive electrode and garnet separator) between the solid-state electrolyte separator (80 μm thick) and a solid-state cathode (⅔ NCA, ⅓ LSTPS catholyte, <5% dow chemical EG8200/Carbon 1.5 wt %/0.5 wt %; approximately 150 μm in thickness. In the figure, 10 is a solid-state cathode, 20 is a bonding layer (not drawn to scale), which is between the treated thin film, 30, and a lithium metal anode, 40.

The ASR of a full cell using the treated sample was tested. A Galvanostatic Intermittent Titration Technique (GITT) test was performed at 45° C. for charging between 3.7-4.3V. The charge pulses were at a C/10 rate for 30 min and the rests were 3 minutes. The test instrument was Arbin potentiostat. The ASR is plotted versus the rest voltage at the end of the rest period. Area-specific resistance was calculated by the formula, $ASR_{dc} = \Delta V/j$, where j is the applied current density during the charge pulse and $\Delta V$ is the voltage difference between the loaded voltage and the resting voltage. The results are shown in FIG. 3.

In FIG. 3, four repeat samples (corresponding to the four plots in FIG. 3) were prepared and tested in which the sintered thin film garnet was treated with SCN+GLN and LiBF$_4$ (12 mol %). FIG. 3 shows the ASR testing results for full cells using these treated garnets. It was observed that they repeatedly have a low full cell ASR, of less than 30 Ωcm$^2$ at 45° C. The cathode, anode interface, and bulk separator account for 15-25 Ωcm$^2$ of the total. The separator-cathode interface has a small contribution to the total resistance.

Example 4—Surface Concentration of Fluorine

This Example shows the depth of penetration into the surface of a sintered LLZO thin film for Fluorine (F) from the solutions in which the thin film is immersed and treated.

Fluorine atomic % was determined by XPS for the sample in Example 1 that was soaked in succinonitrile (SCN) and LiBF$_4$ (12 mol %) for 8 hours and at 70° C. The results are summarized below:

| | Element Atomic % | | | | |
|---|---|---|---|---|---|
| Level | Zr3d % | La4d % | O1s % | F1s % | Li1s % |
| Level 0 (Surface) | 2.9 | 4 | 27.2 | 29.03 | 36.87 |

Figure 4:
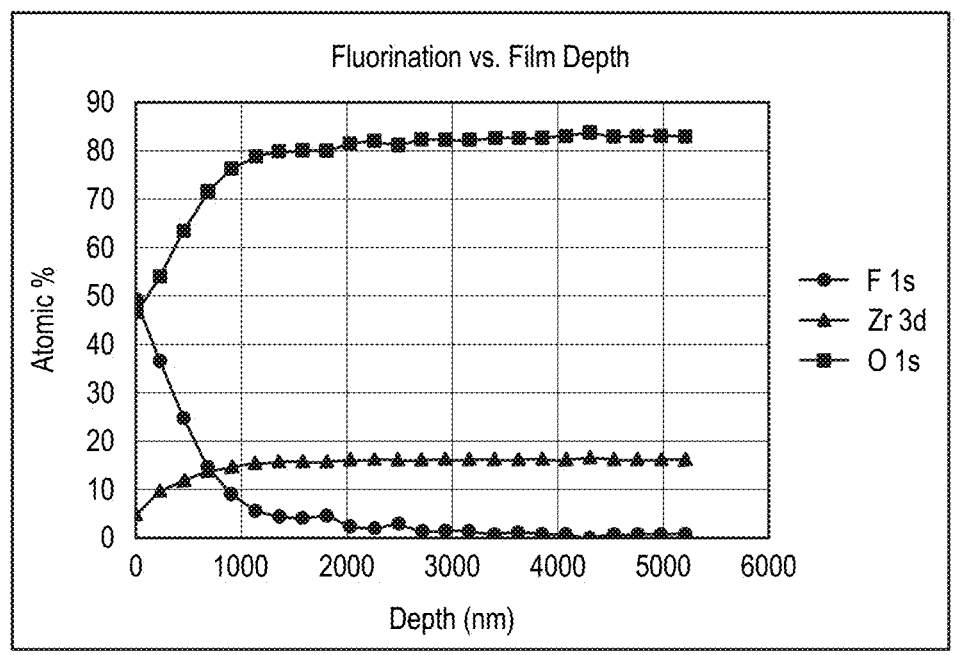
FIG. 4 shows a plot of atom percentages for F, Zr, and O as a function of depth of penetration as measured by x-ray photoelectron spectroscopy (XPS).

Based on the results herein, the depth of penetration into the surface of a sintered LLZO thin film for F from the solutions in which the thin film is immersed and treated was determined to be 1 μm. These results are shown in FIG. 4. FIG. 4 also shows the depth of penetration of Zr and O in the surface of the sintered LLZO thin film.

Example 5—NMR Measurement Showing F Incorporation in the Lattice of LLZO Rather than as Another Species (e.g., LIF)

The sample from Example 4 was analyzed by $^{19}$F solid-state NMR.

Figure 5:
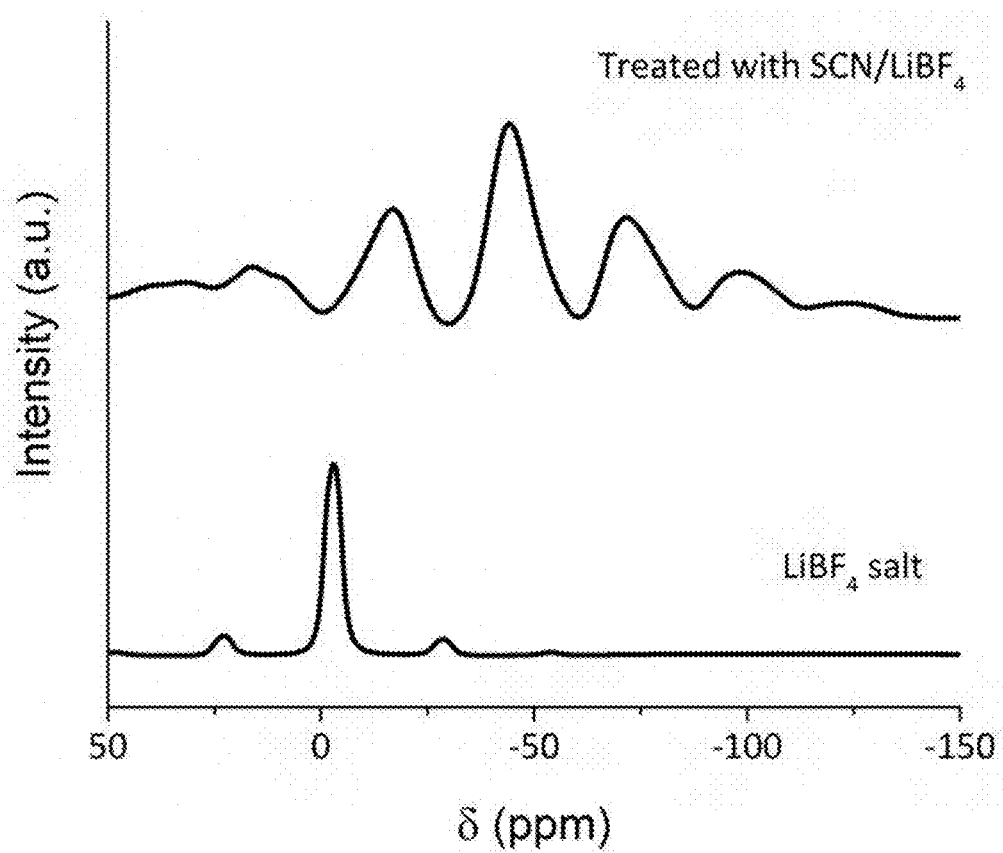
FIG. 5 shows the chemical shifts in a Fluorine-19 solid-state nuclear magnetic resonance (NMR) spectroscopy measurement as described in Example 5.

The results are shown in FIG. 5.

The NMR results show that F is incorporated into the lattice of LLZO rather than into another species, e.g. LiF.

The fluoride NMR shows shift of the peaks. The bottom spectrum is of dry LiBF$_4$. The spectrum is referenced at zero with CFCl$_3$. The top spectrum is that of the sintered LLZO thin film that was treated with SCN/LiBF$_4$. The fluorine peak has shifted compared to the pure LiBF$_4$ peak because the BF$_4$ has reacted with the garnet surface and changed the chemical environment.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

The invention claimed is:

1. A process for making a sintered lithium-stuffed garnet thin film or pellet, comprising
   (1) providing a solution comprising a fluoride salt and a solvent;
   (2) providing a sintered lithium-stuffed garnet thin film or pellet;
   (3) immersing at least one surface of the sintered lithium-stuffed garnet thin film or pellet in the solution at a temperature between, or equal to, 0° C. and 60° C.; and
   (4) removing the at least one surface of the sintered lithium-stuffed garnet thin film from the solution.

2. The process of claim 1, wherein fluoride salt is selected from the group consisting of LiPF$_6$, lithium bis(perfluoroethanesulfonyl)imide (LIBETI), bis(trifluoromethane)sulfonimide lithium salt (LiTFSI), LiBF$_4$, LiAsF$_6$, lithium bis(fluorosulfonyl)imide (LiFSI), and combinations thereof.

3. The process of claim 1, wherein the concentration of fluoride salt is about 0.5 M to about 1.5 M.

4. The process of claim 1, wherein the solvent is selected from the group consisting of ethylene carbonate (EC), diethylene carbonate, dimethyl carbonate (DMC), ethylmethyl carbonate (EMC), propylmethyl carbonate, nitroethyl carbonate, propylene carbonate (PC), diethyl carbonate (DEC), methyl propyl carbonate (MPC), 2,5-dioxahexanedioic acid dimethyl ester, tetrahydrofuran (THF), γ-butyrolactone (GBL), fluoroethylene carbonate (FEC), fluoromethyl ethylene carbonate (FMEC), trifluoroethyl methyl carbonate (F-EMC), fluorinated 3-(1,1,2,2-tetrafluoroethoxy)-1,1,2,2-tetrafluoropropane/1,1,2,2-tetrafluoro-3-(1,1,2,2-tetrafluoroethoxy)propane (F-EPE), fluorinated cyclic carbonate (F-AEC), dioxolane, prop-1-ene-1,3-sultone (PES), sulfolane, acetonitrile (ACN), succinonitrile (SCN), pimelonitrile, suberonitrile, propionitrile, propanedinitrile, glutaronitrile (GLN), adiponitrile (ADN), hexanedinitrile, pentanedinitrile, acetophenone, isophorone, benzonitrile, ethyl propionate, methyl propionate, methylene methanedisulfonate, dimethyl sulfate, dimethyl sulfoxide (DMSO), ethyl acetate, methyl butyrate, dimethyl ether (DME), diethyl ether, dioxolane, gamma butyl-lactone, methyl benzoate, 2-methyl-5-oxooxolane-2-carbonitrile, and combinations thereof.

5. The process of claim 4, wherein the solvent is selected from the group consisting of succinonitrile (SCN), glutaronitile (GLN), sulfolane, ethylene carbonate (EC), ethylmethyl carbonate (EMC), and combinations thereof.

6. The process of claim 5, wherein the solvent has a water content less than 200 ppm, or less than 150 ppm, or less than 100 ppm, or less than 60 ppm, or less than 50 ppm, or less than 40 ppm, or less than 30 ppm, or less than 20 ppm, or less than 10 ppm.

7. The process of claim 1, wherein the lithium-stuffed garnet thin film or pellet, prior to step 3, is characterized by the chemical formula $Li_4La_BAl_CM''_DZr_EO_F$, wherein $5<A<8$, $1.5<B<4$, $0.1<C<2$, $0≤D<2$, $1<E<3$, $10<F<13$, and M'' is selected from the group consisting of Mo, W, Nb, Y, Ta, Ga, Sb, Ca, Ba, Sr, Ce, Hf, and Rb.

8. The process of claim 1, wherein the at least one surface of the lithium-stuffed garnet thin film or pellet, after step 4, has a fluorinated surface.

9. The process of claim 8, wherein the at least one surface of the lithium-stuffed garnet thin film or pellet, after step 4, has fluorine or fluoride present at a depth of penetration ranging from about 0.5 μm to about 1.5 μm.

10. The process of claim 8, wherein the at least one surface of the lithium-stuffed garnet thin film or pellet, after step 4, comprises fluorine bonded to one or more elements in the lithium-stuffed garnet.

11. The process of claim 1, wherein the at least one surface is free or substantially free of a contaminant after step 3.

12. The process of claim 11, wherein the contaminant is $Li_2CO_3$.

13. A sintered lithium-stuffed garnet thin film or pellet comprising:
a top surface and bottom surface and a bulk therebetween,
wherein the top surface or bottom surface, or both, comprise fluorine;
wherein the fluorine is incorporated into, or bonded to, the lithium-stuffed garnet.

14. The sintered lithium-stuffed garnet thin film or pellet of claim 13, wherein the lithium-stuffed garnet thin film or pellet bulk is characterized by the chemical formula $Li_4La_BAl_CM''_DZr_EO_F$, wherein $5<A<8$, $1.5<B<4$, $0.1<C<2$, $0≤D<2$, $1<E<3$, $10<F<13$, and M'' is selected from the group consisting of Mo, W, Nb, Y, Ta, Ga, Sb, Ca, Ba, Sr, Ce, Hf, and Rb.

15. The sintered lithium-stuffed garnet thin film or pellet of claim 13, wherein the at least one surface of the lithium-stuffed garnet thin film or pellet has a fluorinated surface.

16. The sintered lithium-stuffed garnet thin film or pellet of claim 15, wherein the at least one surface of the lithium-stuffed garnet thin film or pellet has fluorine or fluoride present at a depth of penetration ranging from about 0.5 μm to about 1.5 μm.

17. The sintered lithium-stuffed garnet thin film or pellet of claim 16, wherein the at least one surface of the lithium-stuffed garnet thin film or pellet comprises fluorine bonded to one or more elements in the lithium-stuffed garnet.

18. The sintered lithium-stuffed garnet thin film or pellet of claim 14, wherein the sintered lithium-stuffed garnet is a thin film.

19. The sintered thin film lithium-stuffed garnet of claim 13, wherein the top surface or bottom surface, or both, remain free or substantially free of a contaminant after exposure to ambient conditions for 1 day to 365 days.

20. The sintered thin film lithium-stuffed garnet of claim 19, wherein the contaminant is selected from the group consisting of hydroxides, peroxides, oxides, carbonates, and combination thereof.

21. The sintered thin film lithium-stuffed garnet of claim 20, wherein the contaminant is $Li_2CO_3$.

* * * * *